(12) United States Patent
Huang et al.

(10) Patent No.: US 10,416,311 B2
(45) Date of Patent: Sep. 17, 2019

(54) SYSTEMS AND TECHNIQUES FOR GEOFENCE CROSSING-BASED CONTROL

(71) Applicant: Intel Corporation, Santa Clara, CA (US)

(72) Inventors: YuHuan Huang, Shanghai (CN); Ke Han, Shanghai (CN); Ke Ding, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 14/652,764

(22) PCT Filed: Jul. 22, 2014

(86) PCT No.: PCT/CN2014/082705
§ 371 (c)(1),
(2) Date: Jun. 16, 2015

(87) PCT Pub. No.: WO2016/011599
PCT Pub. Date: Jan. 28, 2016

(65) Prior Publication Data
US 2016/0266258 A1 Sep. 15, 2016

(51) Int. Cl.
*G01S 19/02* (2010.01)
*G01S 19/34* (2010.01)
(Continued)

(52) U.S. Cl.
CPC .............. *G01S 19/02* (2013.01); *G01S 19/34* (2013.01); *G06F 21/62* (2013.01); *H04W 4/021* (2013.01);
(Continued)

(58) Field of Classification Search
CPC ...... G01S 19/02; G01S 19/34; B60L 2260/50; B60L 2260/52
(Continued)

(56) References Cited

U.S. PATENT DOCUMENTS

| 8,755,824 B1 | 6/2014 | Wang et al. |
| 2007/0176771 A1 | 8/2007 | Doyle |

(Continued)

FOREIGN PATENT DOCUMENTS

| CN | 103491505 A | 1/2014 |
| WO | WO2013166028 A1 | 11/2013 |

OTHER PUBLICATIONS

International Search Report and Written Opinion dated Apr. 24, 2015 for International Application No. PCT/CN2014/082705, 11 pages.

(Continued)

*Primary Examiner* — Vladimir Magloire
*Assistant Examiner* — Helena H Seraydaryan
(74) *Attorney, Agent, or Firm* — Schwabe, Williamson & Wyatt, P.C.

(57) ABSTRACT

Geofence crossing-based control systems and techniques are described herein. For example, a geofence crossing control technique may include receiving a location signal indicative of a range of locations in which a mobile computing device is located; receiving a velocity signal indicative of a speed and direction of the mobile computing device; generating, for each of a plurality of candidate geofence crossing times, a performance indicator based on the location signal, the velocity signal, and a boundary of the geofence; selecting a geofence crossing time from the plurality of candidate geofence crossing times based on the performance indicators; and transmitting a control signal representative of the geofence crossing time. Other embodiments may be disclosed and/or claimed.

27 Claims, 10 Drawing Sheets

(51) Int. Cl.
*G06F 21/62* (2013.01)
*H04W 4/021* (2018.01)
*H04W 4/02* (2018.01)

(52) U.S. Cl.
CPC ....... *B60L 2260/50* (2013.01); *B60L 2260/52* (2013.01); *G06F 2221/2111* (2013.01); *G06F 2221/2151* (2013.01); *H04W 4/027* (2013.01)

(58) Field of Classification Search
USPC .................................................. 342/357.395
See application file for complete search history.

(56) References Cited

U.S. PATENT DOCUMENTS

| | | | | |
|---|---|---|---|---|
| 2009/0219209 | A1* | 9/2009 | Bush | G01S 5/0257 342/450 |
| 2010/0127919 | A1* | 5/2010 | Curran | H04W 4/021 340/573.4 |
| 2011/0148634 | A1 | 6/2011 | Putz | |
| 2013/0332007 | A1 | 12/2013 | Louboutin | |
| 2014/0236467 | A1* | 8/2014 | Liu | B60L 11/1862 701/123 |

OTHER PUBLICATIONS

"Geo-fence", http://en.wikipedia.org/wiki/Geo-fence, Mar. 21, 2014, 2 pages.
Hossein Rahimi, "An Indoor Geo-Fencing Based Access Control System for Wireless Networks", Jul. 2013, 100 pages, Dalhousie University, Halifax, Nova Scotia.
Office Action dated Aug. 21, 2017 for Korean Patent Application No. 10-2016-7035675, 4 pages.
Extended Supplementary European Search Report, dated Mar. 7, 2018, issued in related European Application No. 14898217.6, 10 pages.
Notice of second Preliminary Rejection, dated Feb. 22, 2018, issued in related Korean Patent Application No. 10-2016-7035675, 4 pages.
Office Action dated Aug. 14, 2087 for Korean Patent Application No. 10-2016-7035675, 4 pages.

* cited by examiner

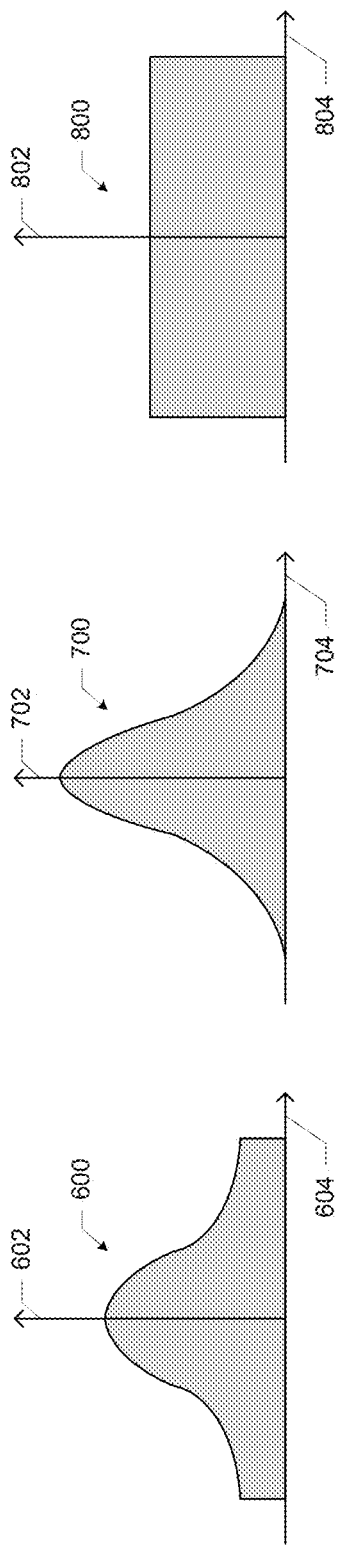
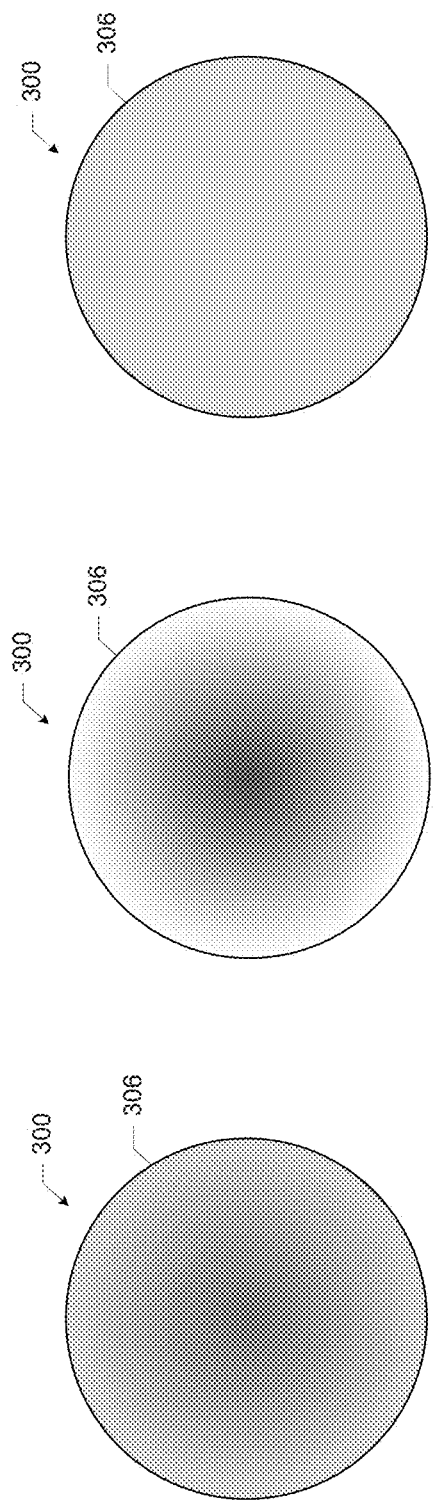
FIG. 6
FIG. 7
FIG. 8

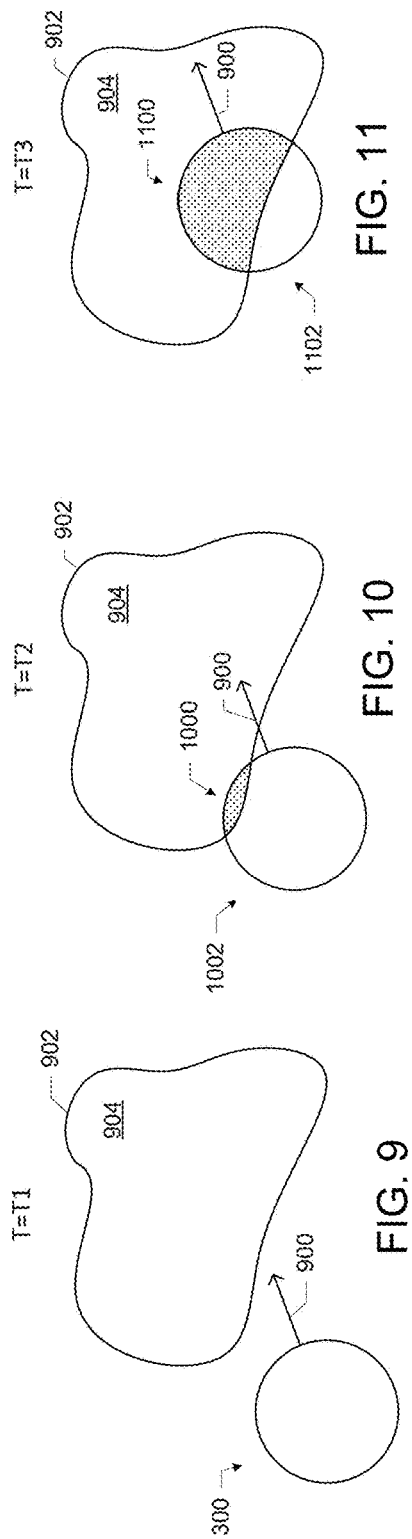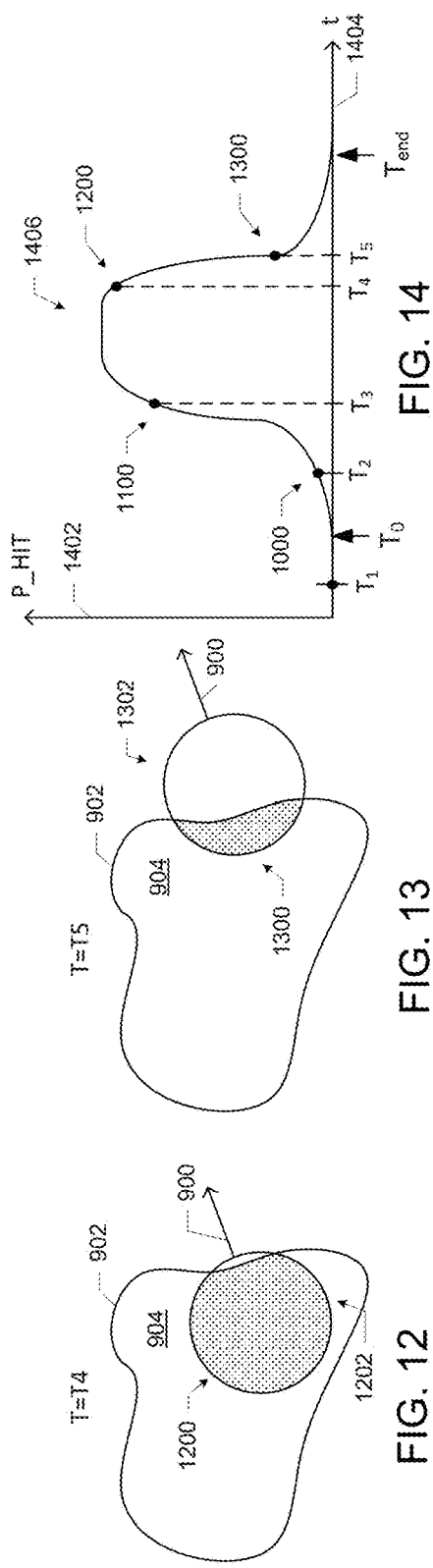

| CANDIDATE TIME | P_HIT | A1 | A2 | ΔT | PRECISION | RECALL | LATENCY | AGGREGATE | SELECTED |
|---|---|---|---|---|---|---|---|---|---|
| T1 | P_HIT(T1) | S1(T1) | S2(T1) | T1-T0 | PREC(T1) | RECALL(T1) | LAT(T1) | AGG(T1) | 0 |
| T2 | P_HIT(T2) | S1(T2) | S2(T2) | T2-T0 | PREC(T2) | RECALL(T2) | LAT(T2) | AGG(T2) | 0 |
| T3 | P_HIT(T3) | S1(T3) | S2(T3) | T3-T0 | PREC(T3) | RECALL(T3) | LAT(T3) | AGG(T3) | 1 |
| T4 | P_HIT(T4) | S1(T4) | S2(T4) | T4-T0 | PREC(T4) | RECALL(T4) | LAT(T4) | AGG(T4) | 0 |
| T5 | P_HIT(T5) | S1(T5) | S2(T5) | T5-T0 | PREC(T5) | RECALL(T5) | LAT(T5) | AGG(T5) | 0 |

FIG. 24

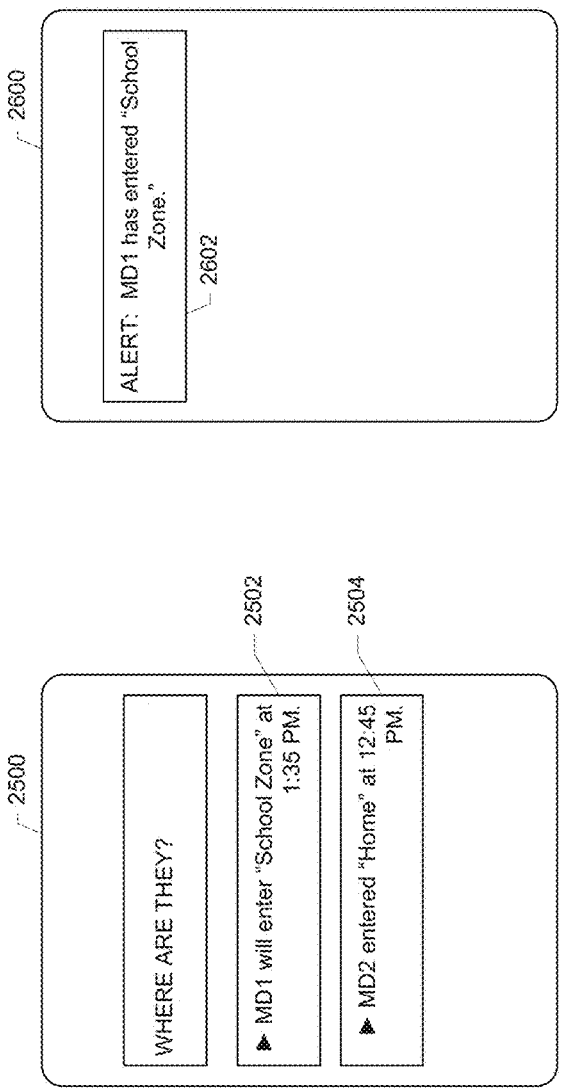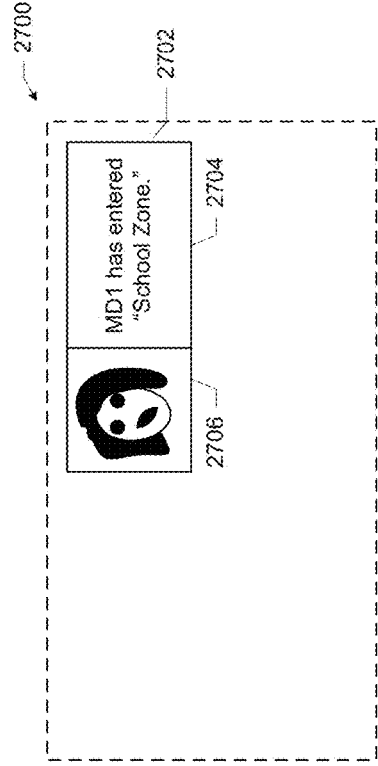

SYSTEMS AND TECHNIQUES FOR GEOFENCE CROSSING-BASED CONTROL

CROSS REFERENCE TO RELATED APPLICATIONS

The present application is a national phase entry under 35 U.S.C. § 371 of International Application No. PCT/CN2014/082705, filed Jul. 22, 2014, entitled "SYSTEMS AND TECHNIQUES FOR GEOFENCE CROSSING-BASED CONTROL", which designated, among the various States, the United States of America. The Specification of the PCT/CN2014/082705 Application is hereby incorporated by reference.

TECHNICAL FIELD

The present disclosure relates generally to the field of geofencing, and more particularly, to geofence crossing-based control.

BACKGROUND

Geofence functionality is implemented in a number of mobile computing device applications. However, existing approaches to detecting geofence crossings fail to achieve a desired performance while avoiding expending excessive power and other resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 6-8 illustrate a number of observed location distribution shapes, in accordance with various embodiments.

FIGS. 9-14 illustrate how a first example performance indicator may be generated by the geofence crossing control system of FIG. 2, in accordance with various embodiments.

FIG. 24 illustrates an example data structure that may be used to store data during the generation of performance indicators by the geofence crossing control system of FIG. 2, in accordance with various embodiments.

FIGS. 25-27 illustrate example visual indicators of geofence crossing times, in accordance with various embodiments.

DETAILED DESCRIPTION

Figure 2:
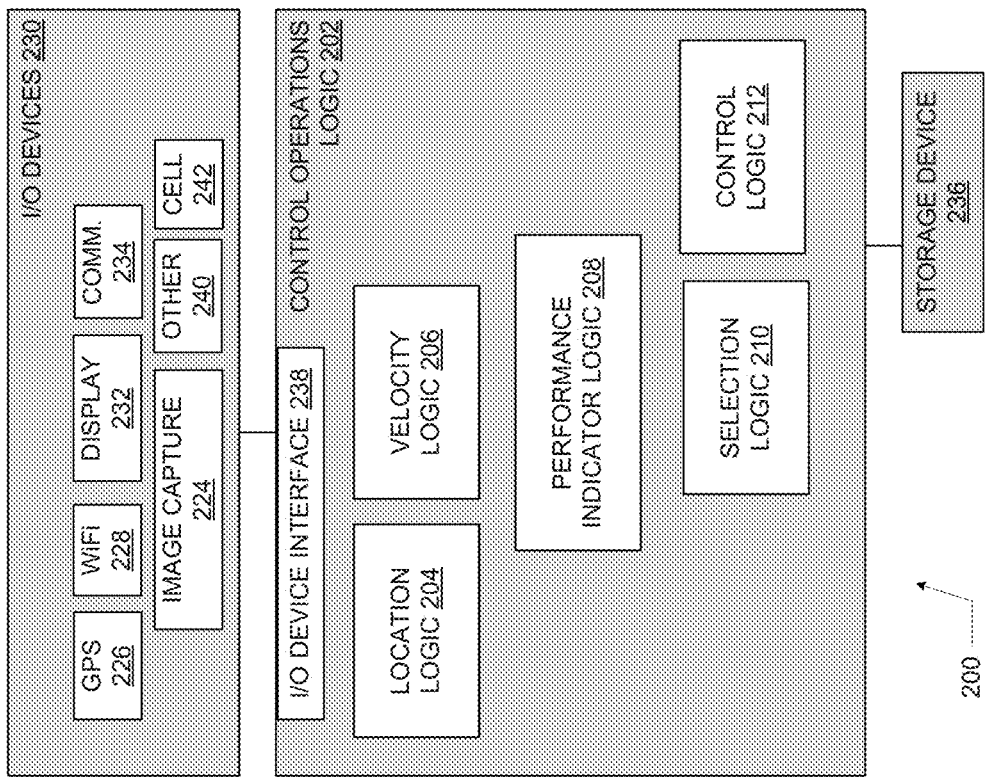
FIG. 2 is a block diagram of an illustrative geofence crossing control system that may be implemented by the computing system of FIG. 1, in accordance with various embodiments.

Computing systems and techniques for geofence crossing-based control are disclosed herein. For example, in some embodiments, a computing system for control based on geofence crossings may include performance indicator logic, selection logic, and control logic. The performance indicator logic may be configured to: receive a location signal indicative of a range of locations in which a mobile computing device is located; receive a velocity signal indicative of a speed at which the mobile computing device is moving and a direction in which the mobile computing device is moving; and for each of a plurality of candidate geofence crossing times, generate a performance indicator based on the location signal, the velocity signal, and a boundary of the geofence. The selection logic may be coupled with the performance indicator logic, and may be configured to select a geofence crossing time from the plurality of candidate geofence crossing times based on the performance indicators. The control logic may be coupled with the selection logic, and may be configured to transmit a control signal representative of the geofence crossing time to the computing system or another computing system.

Some embodiments of the computing systems and techniques disclosed herein may enable geofence crossing detection with higher accuracy and lower power than existing techniques. A geofence may be defined by a radius or boundary around an area of interest. For example, a school zone or neighborhood may be defined by a number of streets that border a particular area. When a mobile computing device carried by a user (or traveling in a user's vehicle, for example) enters or exits a geofence, the mobile computing device or another computing device may receive a notification of the crossing. As used herein, a "crossing" may refer to an entrance or exit into a geofenced area. Child location services may utilize geofences to notify parents if a child leaves a designated area. Users may also define zones around places of work, customer sites, and secure areas, among others, and may be notified when their own mobile computing devices or others' mobile computing devices cross the boundaries of these zones. In some applications, when a mobile computing device leaves a geofenced area, the user may be notified via another device (e.g., an e-mail account accessible via a personal computing device, such as a desktop computer) that the mobile computing device may have been stolen.

Mobile computing devices may be desired as targets for geofencing applications, as they have the potential to provide "always on" location-based services. However, mobile computing devices often have limited power resources that may be quickly drained by constant location monitoring and communication. Additionally, various types of location monitoring devices present different tradeoffs between location accuracy and power consumption. For example, Global Positioning System (GPS) devices may be able to provide location information with high accuracy (e.g., a small range of possible locations), but may require significant power resources relative to the power resources required by cellular and/or WiFi-based location devices, which provide location information with coarser accuracy (e.g., a larger range of possible locations). A challenge in geofencing with mobile computing devices, therefore, is determining when a mobile computing device crosses a geofence boundary in a manner that balances resource efficiency with performance.

Existing approaches to this problem have not yielded a satisfactory result. For example, one existing approach reports a geofence boundary crossing when the boundary of the location range of the mobile computing device first intersects with the boundary of the geofence. This approach, by definition, will report boundary crossings before the mobile computing device has actually crossed into the geofenced area, and thus the probability that the mobile device is actually in the geofenced area when the crossing is reported (a statistic that may be referred to as "precision") is approximately zero. In other words, the crossing may be reported too early. Another existing approach reports a geofence boundary crossing when the boundary of the location range of the mobile computing device is first wholly contained in the geofenced area. This approach, by definition, will report boundary crossings after the mobile computing device has actually crossed into the geofenced area, and thus the delay between the actual crossing and the report (a statistic that may be referred to as "latency") is likely to be high, and the probability that the crossing has been reported given that the user is actually in the geofenced area (a statistic that may be referred to as "recall") is likely to be low. In other words, the crossing may be reported too late.

In another existing approach, a geofence boundary crossing is reported when a center (e.g., a center of gravity) of the location range of the mobile computing device first intersects with the boundary of the geofence. This approach may achieve better recall, precision, and latency than the previous two approaches, but may not readily adapt to different geofence shapes, different relationships between the direction of travel of the mobile computing device and the geofence boundary, and the potential for a non-uniform probability distribution of the location of the mobile computing device within the location range.

Various embodiments of the systems and techniques disclosed herein may address these and other inadequacies of existing approaches. In some embodiments, the location and velocity of a mobile computing device may be processed to generate performance indicators for each of a plurality of candidate geofence crossing times, and the "best" geofence crossing time may be selected. For example, the selected geofence crossing time may be the time at which a precision indicator, a recall indicator, or an aggregation of these performance indicators is maximized. Upon selection of this geofence crossing time, visual notifications may be provided at the mobile computing device or other computing devices, and/or functionality of the mobile computing device may be adjusted in response. Performance indicators associated with the selected geofence crossing time, such as the precision indicator, the recall indicator, a latency indicator, and/or an aggregated performance indicator, may be provided along with the selected geofence crossing time, enabling the receiving computing device to evaluate the geofence performance. In some embodiments, the receiving computing device may provide feedback on the geofence performance, which may be used to adjust various parameters in the generation of the performance indicators (e.g., one or more weights used in the generation of an aggregate performance indicator).

In some embodiments, the prediction of a geofence crossing time in the future may be used to put the mobile computing device into a "sleep" state with respect to location detection; the mobile computing device may "wake up" when the geofence crossing time is reached or is near, and another location measurement may be taken. In this manner, the power resources of the mobile computing device may be conserved while still achieving satisfactory geofence performance.

Although geofence entrance events may be discussed most often herein, this is simply for illustrative purposes, and all of the systems and techniques disclosed may be applied to geofence exit events in accordance with the teachings herein. Various ones of the techniques disclosed herein may provide advantageous performance under different scenarios, such as when the mobile computing device is moving toward a geofence boundary and when the mobile computing device is moving past the geofence boundary.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. As used herein, a signal may be "received" by a component if it is generated externally or internally to that component, and acknowledged and/or processed by that component.

Figure 1:
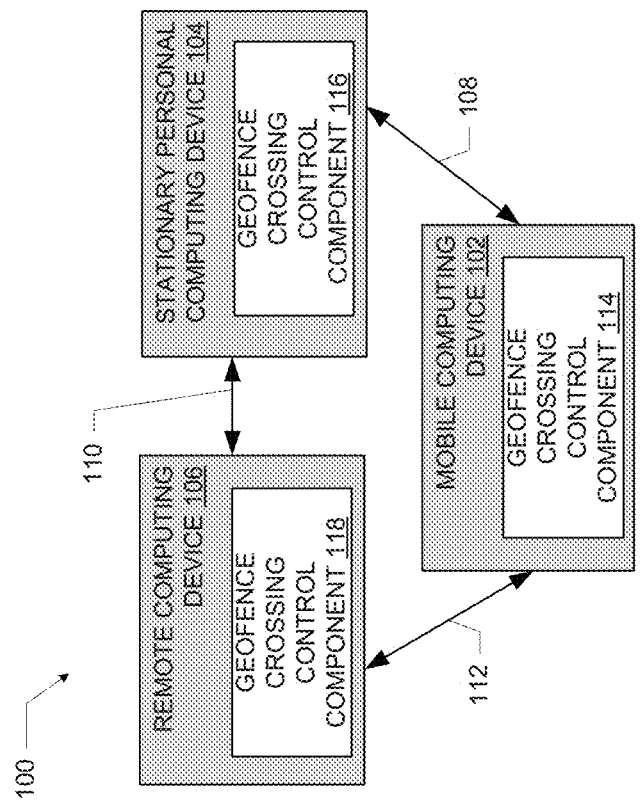
FIG. 1 is a block diagram of an illustrative computing system configured for geofence crossing-based control, in accordance with various embodiments.

FIG. 1 depicts an illustrative computing system 100 configured for control based on geofence crossings, in accordance with various embodiments. In some embodiments, the computing system 100 may be configured to receive a location signal indicative of a range of locations in which a mobile computing device is located, and receive a velocity signal indicative of the speed at which the mobile computing device is moving and a direction in which the mobile computing device is moving. The computing system 100 may be configured to generate, for each of a plurality of candidate geofence crossing times, a performance indicator based on the location signal, the velocity signal, and/or a boundary of the geofence. The computing system 100 may be configured to select a geofence crossing time from the plurality of candidate geofence crossing times based on the performance indicators, and to transmit a control signal representative of the geofence crossing time to the computing system 100 or to another computing device. In some embodiments, the computing system 100 may include hardware configured to generate the location signal and/or the velocity signal (e.g., GPS and/or WiFi-based location devices) and hardware to control the operation of the computing system 100 based on the geofence crossing time (e.g., a monitor for displaying a visual indicator of the geofence crossing time and/or triggering circuitry for causing the computing system 100 to initiate a location measurement when the geofence crossing time is reached).

The computing system 100 may include a mobile computing device 102, a stationary personal computing device 104, and a remote computing device 106. Each of the mobile computing device 102, the stationary personal computing device 104, and the remote computing device 106 may include geofence crossing control components (illustrated in FIG. 1 as geofence crossing control components 114, 116, and 118, respectively). Geofence crossing control operations may be distributed between the geofence crossing control components 114, 116, and 118 of the computing system 100 as suitable. Several examples of the distribution of operations between the components of the computing system 100 are discussed herein, but any other combination of more or less components and distribution of the operations may be used. In some embodiments, the computing system 100 may be configured as the geofence crossing control system 200, discussed below with reference to FIG. 2.

Communication within the computing system 100 may be enabled by the communication pathways 108, 110, and 112. The communication pathways 108, 110, and 112 may each include wired communication pathways and/or wireless communication pathways, over direct couplings, and/or over personal, local, and/or wide area networks. Each of the mobile computing device 102, the stationary personal computing device 104, and the remote computing device 106 may include suitable hardware for supporting the communication pathways 108, 110, and 112, such as network interface cards, modems, WiFi devices, Bluetooth devices, and so forth. In some embodiments, the communication pathways 108, 110, and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the computing devices included in the computing system 100 may include a processing device and a storage device (not shown). The processing device may include one or more processing devices, such as one or more processing cores, application specific integrated circuits (ASICs), electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM), and so forth). Each of the computing devices included in the computing system 100 may include one or more buses (and bus bridges, if suitable) to communicatively couple the processing device, the storage device, and any other devices including in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. The mobile computing device 102, the stationary personal computing device 104, and the remote computing device 106 may each include peripheral devices, which may communicate via wired or wireless communication pathways, such as cameras, printers, scanners, radio frequency identification (RFID), readers, credit card swipe devices, or any other peripheral devices. Except for the geofence crossing control teachings of the present disclosure incorporated therein, the mobile computing device 102, the stationary personal computing device 104, and the remote computing device 106 may be a broad range of such devices known in the art. Specific, but not limiting, examples are described below. In some embodiments, the computational logic may include any of the logic discussed below with reference to FIG. 2.

The mobile computing device 102 may be a computing device that is configured for carrying along with a user. In some embodiments, the mobile computing device 102 may be a wearable computing device, and may be integrated into a garment, accessory, or other support structure that is configured to be worn on the body of the user (or "wearer"). Examples of suitable support structures for the mobile computing device 102 may include glasses, a headset, a hair accessory (e.g., a headband or barrette), an ear piece, jewelry (e.g., brooch, earrings, or a necklace), a wrist band (e.g., a wristwatch), a neck band (e.g., a tie or scarf), a garment (e.g., a shirt, pants, dress skirt, or jacket), a hat, shoes, a lanyard or name tag, a contact lens, or an implantable support structure, among others. In some embodiments, the mobile computing device 102 may include one or more devices for generating data about the location and/or velocity of the mobile computing device 102, such as a GPS device, a WiFi-based location device, a cellular network-based location device, an image capture device for capturing images of the environment of the mobile computing device 102, an accelerometer, an altimeter, or any other such device. The mobile computing device 102 may also include a communications device for wired and/or wireless transmission of the location and/or velocity data to other computing devices (e.g., the stationary personal computing device 104 and the remote computing device 106).

In some embodiments, the mobile computing device 102 may be a computing device configured for carrying in a pocket, backpack, or other carrying case. Examples of mobile computing devices that may serve as the mobile computing device 102 include cellular phones, smartphones, other personal mobile communication devices, tablets, electronic book readers, personal digital assistants, laptops, or other such computing devices. Geofence crossing control and other operations performed by the mobile computing device 102 may be controlled by an app or plug-in on the mobile computing device 102, for example. Although the mobile computing device 102 may be referred to in the singular, the mobile computing device 102 may include two or more distinct devices associated with the user. For example, the mobile computing device 102 may include a wrist-mounted computing device in communication with a smartphone. Processing operations performed by the mobile computing device 102 in this example may be distributed between the wrist-mounted computing device and the smartphone.

In some embodiments, the stationary personal computing device 104 may be a computing device configured to rest semi-permanently on a surface (e.g., as a server does in a rack or a desktop computer does on a desk). Examples of personal computing devices that may serve as the stationary personal computing device 104 include desktop computing devices, point-of-sale terminals, and large shared computing kiosks. Geofence crossing control and other operations performed by the personal computing device 104 may be controlled by an application or plug-in on the personal computing device 104, for example. In some embodiments, the stationary personal computing device 104 or the remote computing device 106 may have more computing resources (e.g., processing power, memory, and/or communication bandwidth) than the mobile computing device 102. Thus, in some embodiments, data captured and preliminarily processed by the mobile computing device 102 may be transmitted over the communication pathway 108 to the personal computing device 104, or over the communication pathway 112 to the remote computing device 106, for further processing.

The remote computing device 106 may include one or more servers (e.g., arranged in a "cloud" computing configuration) or other computing devices remote from the mobile computing device 102 and the stationary personal computing device 104. The communication pathway 112 between the mobile computing device 102 and the remote computing device 106, and the communication pathway 110 between the stationary personal computing device 104 and the remote computing device 106, may be configured according to any remote wired or wireless communication protocol. In some embodiments, the remote computing device 106 may have more computing resources (e.g., processing power, memory, and/or communication bandwidth) than the mobile computing device 102 or the stationary personal computing device 104. Thus, in some embodiments, data captured and preliminarily processed by the mobile computing device 102 and/or the stationary personal computing device 104 may be transmitted over the communication pathways 110 and/or 112 to the remote computing device 106 for further processing. In some embodiments, the remote computing device 106 may perform most of the geofence crossing control operations discussed below with reference to FIG. 2, including those performed by the performance indicator logic 208, for example.

In some embodiments, the remote computing device 106 may communicate with a plurality of stationary personal computing devices (configured similarly to the stationary personal computing device 104) and/or a plurality of mobile computing devices (configured similarly to the mobile computing device 102). The remote computing device 106 may perform similar processing and storage operations for each mobile or stationary personal computing device. For example, the remote computing device 106 may receive location and velocity signals provided by a plurality of mobile or stationary personal computing devices (configured similarly to the mobile computing device 102 or stationary personal computing device 104) and may perform geofence crossing control operations based on the location and velocity signals (e.g., generating performance indicators, as discussed below with reference to the performance indicator logic 208). The remote computing device 106 may devote different resources to different ones of the plurality of personal or wearable computing devices in communication with the remote computing device (e.g., different memory partitions or databases for each device).

In some embodiments of the geofence crossing control systems disclosed herein, one or more of the components of the computing system 100 shown in FIG. 1 may not be included. For example, in some embodiments, the computing system 100 may not include a remote computing device 106. In some embodiments, the computing system 100 may not include a stationary personal computing device 104, and all geofence crossing control operations may be distributed between the mobile computing device 102 and the remote computing device 106. In some embodiments, one or more of the communication pathways between components of the computing system 100 may not be included; for example, in some embodiments, the mobile computing device 102 may not communicate directly with the remote computing device 106 via the communication pathway 112 (but may communicate with the remote computing device 106 via the stationary personal computing device 104 and the communication pathways 108 and 110).

FIG. 2 depicts an illustrative geofence crossing control system 200, in accordance with various embodiments. As discussed above with reference to the computing system 100, the geofence crossing control system 200 may be configured to perform any of a number of geofence crossing control operations. For example, the geofence crossing control system 200 may be configured to receive a location signal indicative of a range of locations in which a mobile computing device is located, see the velocity signal indicative of a speed at which the mobile computing device is moving and a direction in which the mobile computing device is moving, generate a performance indicator based on the location signal, the velocity signal, and a boundary of the geofence for each of a plurality of candidate geofence crossing times, select a geofence crossing time from the plurality of candidate geofence crossing times based on the performance indicators, and transmit a control signal representative of the geofence crossing time. The geofence crossing control system 200 may be implemented by the computing system 100 of FIG. 1, in accordance with various embodiments. In particular, the mobile computing device may be the mobile computing device 102. The components of the geofence crossing control system 200 may be distributed in any suitable manner among one or more of the components of the computing system 100. Although a number of components are illustrated in FIG. 2, various embodiments may omit components as appropriate for the geofence crossing control operations to be performed. For example, some embodiments of the geofence crossing control system 200 may not be configured for WiFi location determination (and instead may use another location determination technique, or receive a location signal from an external device), and thus may not include the WiFi device 228.

The geofence crossing control system 200 may include input/output (I/O) devices 230. The I/O devices 230 may include an image capture device 224, a GPS device 226, a WiFi device 228, a display 232, a communication device 234, and/or other I/O devices 240. Although the I/O devices 230 (and other components described herein) may be referred to in the plural, any number of I/O devices may be included in the I/O devices 230 (and similarly, any component may include multiple such components).

In some embodiments, the image capture device 224 may include one or more digital cameras, for example, and may use any imaging wavelength (e.g., visible or infrared light). Images captured by the image capture device 224 may be used to generate a location signal indicative of a range of locations of the mobile computing device 102 and/or a velocity signal indicative of a speed and direction in which the mobile computing device 102 is moving. For example, images captured by the image capture device 224 of the environment of the mobile computing device 102 may be transmitted to the location logic 204 (discussed below), and the location logic 204 may compare the captured images to images stored in the storage device 236 to identify recognized landmarks, in accordance with known techniques. When landmarks in the environment are identified in the captured images, the location logic 204 may determine an approximate location of the mobile computing device 102, and may generate a location signal accordingly. In some embodiments, the velocity logic 206 may compare multiple images captured by the image capture device 224 of the environment of the mobile computing device 102 to determine the speed at which the mobile computing device 102 is moving (e.g., by dividing the distance traveled between successive images by the time delay between the capture of the successive images). The velocity logic 206 may determine a direction of motion of the mobile computing device 102 by comparing multiple images captured by the image capture device 224 of the environment of the mobile computing device 102 to images stored in the storage device 236; identifying common landmarks between the captured and stored images may allow the velocity logic 206 to identify a direction of motion.

As used herein, the term "camera" may include still image cameras and video cameras. In some embodiments, the image capture device 224 may capture video, such as high-definition video. In some embodiments, the image capture device 224 may be configured to stream image data (e.g., video data) to other devices via a wired or wireless communication pathway. For example, the image capture device 224 may be included in the mobile computing device 102 (FIG. 1), and may stream image data wirelessly to the stationary personal computing device 104 via the communication pathway 108. In some embodiments, the image capture device 224 may be integral or peripheral to the stationary personal computing device 104, and may provide streamed image data. In some embodiments, the image capture device 224 may include a visible light camera and an infrared camera, and may combine the images captured by these devices or treat them separately. In some embodiments, the image capture device 224 may include two or more cameras having different orientations (e.g., one camera that is mounted on, or otherwise associated with, the mobile computing device 102 and faces the front of a user's body, and one camera that is mounted on the mobile computing device 102 and faces away from the user but may include the user's arms and hands as they gesture in front of the user). In some embodiments, the image capture device 224 may capture a sequence of successive images. These successive images may be captured at a rate of multiple frames per second, or faster or slower.

In some embodiments, the image capture device 224 may include a depth camera (which may also be referred to as a "three-dimensional camera"). Images produced by a depth camera may include depth data per pixel. The depth data for a pixel may be a value that represents the distance between an object in an imaged scene corresponding to the pixel, and the image capture device 224. A depth camera may include a depth image sensor, an optical lens, and an illumination source, among other components. The depth image sensor may rely on any of a number of different sensor technologies, such as time-of-flight (TOF) technology (e.g., scanning TOF or array TOF), structured light, laser speckle pattern technology, stereoscopic cameras, active stereoscopic sensors, and shape-from-shading technology, for example. Many depth camera sensor technologies include "active" sensors, which supply their own illumination source.

Other depth camera sensor technologies (e.g., stereoscopic cameras) may include "passive" sensors, which do not supply their own illumination source but depend instead on ambient environmental lighting. In addition to depth data, depth cameras may also generate color data, in the same way that conventional color cameras do, and this color data may be combined with the depth data during processing of depth camera images. In some embodiments, depth data may be used by the location logic 204 to establish the distance between a recognized landmark and the mobile computing device 102 in which the depth camera is mounted or to which the depth camera is proximate, and thereby establish a range of locations in which the mobile computing device 102 is located.

The GPS device 226 may be configured to receive messages from satellites that allow the GPS device 226 to generate location data for a device in which the GPS device 226 is included, in accordance with known techniques. The location data may include latitude, longitude, and altitude, for example. In some embodiments, the GPS device 226 may be included in the mobile computing device 102.

The WiFi device 228 may be configured to generate location data for a device in which the WiFi device 228 is located based on the received signal strengths from identified WiFi beacons (e.g., identified via Service Set Identifiers and/or Media Access Control data) having known positions (e.g., stored in the storage device 236 or another accessible storage device), in accordance with known techniques. In some embodiments, the WiFi device may be included in the mobile computing device 102.

The cellular location device 242 may be configured to generate location data based on multilateration of cellular communication network signals from different radio towers detected at a device in which the cellular location device 242 is located, in accordance with known techniques. In some embodiments, the cellular location device 242 may be included in the mobile computing device 102.

Any other device for location/velocity data generation may be included in the other I/O devices 240, including an accelerometer (whose signal may be integrated once to generate velocity data and twice to generate location data), an altimeter, an Internet Protocol (IP) address detection device, or any other suitable device. The other I/O devices 240 may also include devices that serve functions other than location/velocity determination, such as a keyboard, a cursor control device such as a mouse, a stylus, a touchpad, a bar code reader, a Quick Response (QR) code reader, an RFID reader, a short-range wireless receiver (e.g., a Bluetooth receiver), an audio capture device (which may include one or more microphones arranged in various configurations), an audio output device (e.g., one or more speakers or other audio transducers that may be, for example, mounted in one or more earphones or earbuds), printers, projectors, additional storage devices, or any other suitable I/O device.

The display 232 may include one or more heads-up displays (i.e., displays including a projector arranged in an optical collimator configuration and a combiner to provide data without requiring a user to look away from his or her typical viewpoint), computer monitors, projectors, touch-screen displays, liquid crystal displays (LCDs), light-emitting diode displays, or flat panel displays, for example.

The communication device 234 may include one or more devices that enable wireless and/or wired communication between various devices instantiating the geofence crossing control system 200 and with devices external to the geofence crossing control system 200. In particular, the communication device 234 may enable one or more of the communication pathways 108, 110, and 112 of FIG. 1, and may include suitable hardware for supporting the communication pathways 108, 110, and 112, such as network interface cards, modems, WiFi devices, Bluetooth devices, and so forth.

The geofence crossing control system 200 may include control operations logic 202. The control operations logic 202 may include an I/O device interface 238 configured to receive data from the I/O devices 230, and logic components configured to process information provided by the I/O devices 230 and output the results of the processing to the I/O devices 230. Although the components of the control operations logic 202 are illustrated separately, the components may be combined or divided as suitable, and each may use one or more of the results generated by others in performing its own processing, as discussed below. Data may be communicated between the components of the control operations logic 202 over a physical bus, a long-distance wired communication pathway, a short- or long-distance wireless communication pathway, or any combination of communication pathways. The geofence crossing control system 200 may include a storage device 236. In some embodiments, the storage device 236 may include one or more databases or other data storage structures, which may include memory structures for storing any of the data described herein used for geofence crossing control operations. Examples of data structures that may be included in the storage device 236 are discussed below. The storage device 236 may include any volatile or nonvolatile memory device, such as one or more hard drives, solid state logic, or portable storage media, for example.

The control operations logic 202 may include location logic 204, which may be configured to generate a location signal indicative of a range of locations in which the mobile computing device 102 may be located. The location signal may be an electronic signal that encodes information about the range of locations.

Figure 5:
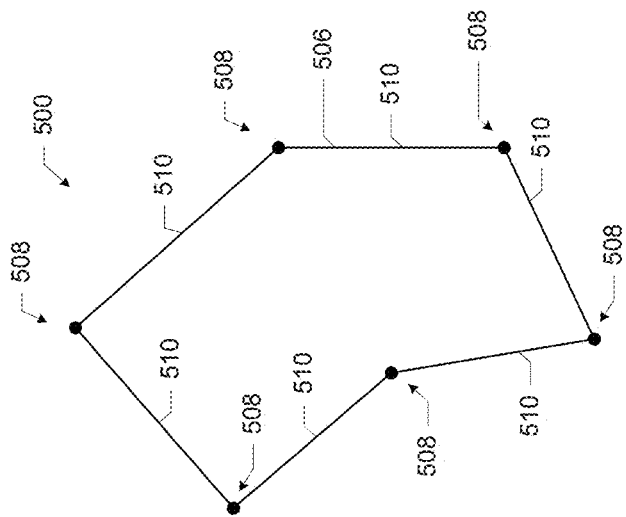
FIGS. 3-5 illustrate a number of example mobile computing device location ranges that may be indicated by a location signal generated by the geofence crossing control system of FIG. 2, in accordance with various embodiments.
Figure 4:
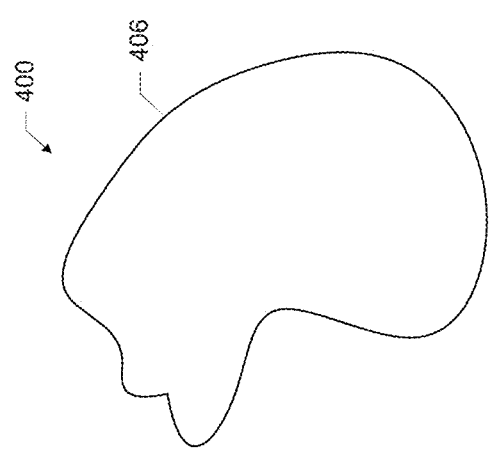
Figure 3:
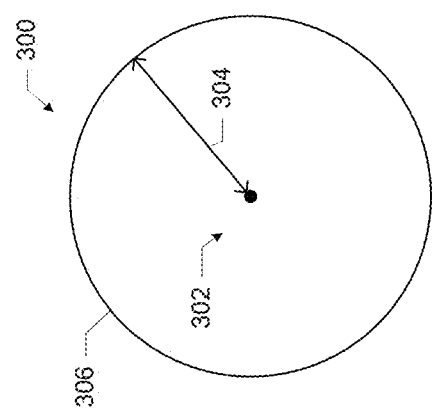

The range of locations may take any of a number of forms, and may be expressed in any desired coordinates or measurement units (e.g., latitude/longitude, English or metric units, etc.). FIGS. 3-5 illustrate a number of example location ranges that may be indicated by the location signal generated by the location logic 204. In FIG. 3, the location range 300 is bounded by a circular location range boundary 306 that is defined by a nominal location 302 and an accuracy radius 304. In some embodiments, the location signal indicative of the location range 300 may encode the nominal location 302 and the accuracy radius 304

In FIG. 4, the location range 400 is bounded by an irregular location range boundary 406. In some embodiments, the location signal indicative of the location range 400 may encode a number of points along the location range boundary 406. In some embodiments, the location signal may also include an interpolation rule for interpolating between the points, while in other embodiments, the performance indicator logic 208 may be preprogrammed with an interpolation rule.

In FIG. 5, the location range 500 is bounded by a polygon location range boundary 506, defined by a number of location range boundary corners 508 connected by location range boundary segments 510. In some embodiments, the location signal indicative of the location range 500 may encode the location range boundary corners 508. The location range boundary corners 508 may be ordered or otherwise tagged to indicate which location range boundary corners 508 are adjacent. In some embodiments, the location signal may also include the location range boundary segments 510, while in other embodiments, the performance indicator logic 208 may be preprogrammed to interpolate between the location range boundary corners 508 to identify the location range boundary segments 510.

In some embodiments, the control operations logic 202 may not include the location logic 204. Instead, the location logic 204 may be included in an external device, and the location signal may be communicated to the control operations logic 202 via the communication device 234 and the I/O device interface 238.

Any of the forms of the location ranges discussed above may be used to describe the geofence with respect to which the location of the mobile computing device 102 will be evaluated. For example, a geofence may be described by a center point and a radius, by number of points along a regular boundary, or by a number of corner points for a polygonal boundary. Any of these representations of the geofence boundary may be stored in the storage device 236, and may be accessed by the performance indicator logic 208 when selecting a geofence crossing time, as discussed below. The storage device 236 may store data representative of the boundaries of a number of geofences. For example, the storage device 236 may store "home" and "work" geofences for a particular user. The storage device 236 may store one or more geofences for one or more users, and may store a table that associates different users with different mobile computing devices.

The control operations logic 202 may include velocity logic 206, which may be configured to generate a velocity signal indicative of the speed at which the mobile computing device 102 is moving and a direction in which the mobile computing device 102 is moving. The velocity signal may be an electronic signal that encodes information about the speed and direction of the mobile computing device 102. In some embodiments, the velocity logic 206 may generate the velocity signal based on the location signal generated by the location logic 204. In particular, the velocity logic 206 may receive location signals indicative of the location of the mobile computing device 102 at two different times, and may compare the two location signals to estimate the speed and direction. For example, in embodiments in which the location range is circular and defined by a nominal location and an accuracy radius (e.g., as discussed above with reference to FIG. 3), the velocity logic 206 may compare the nominal location of the first location signal and the nominal location of the second location signal, determine the speed by dividing the distance between the two nominal locations by the time difference, and determine the direction by determining the orientation of a line segment connecting the two nominal locations. In other embodiments, the velocity logic 206 may generate the velocity signal based on signals other than location signal. For example, when the I/O devices 230 include an accelerometer, the velocity logic 206 may determine a speed by integrating the acceleration signal from the accelerometer over a predetermined window. When the I/O devices 230 include a compass, the velocity logic 206 may determine a direction based on a direction signal from the compass. Any other technique for velocity determination may be used.

In some embodiments, the control operations logic 202 may not include the velocity logic 206. Instead, the velocity logic 206 may be included in an external device, and the velocity signal may be communicated to the control operations logic 202 via the communication device 234 and the I/O device interface 238.

The control operations logic 202 may include performance indicator logic 208, which may be coupled with the location logic 204 and the velocity logic 206, and may be configured to generate a performance indicator for each of a plurality of candidate geofence crossing times based on the location signal (generated by the location logic 204), the velocity signal (generated by the velocity logic 206), and a boundary of the geofence (stored, for example, in the storage device 236). In some embodiments, when multiple geofences are associated with a particular mobile computing device 102, the performance indicator logic 208 may use the location signal to determine which of the multiple geofences is "closest" to the location range of the mobile computing device 102, and then for use in further processing. In some embodiments, the performance indicator logic 208 may process the location and velocity signals with respect to multiple geofence boundaries (e.g., in parallel, in series, or in any combination) and may generate performance indicators for a plurality of candidate geofence crossing times for each of the multiple geofences. For ease of illustration, processing of location and velocity data with reference to a single geofence will be principally discussed herein.

In some embodiments, the performance indicator logic 208 may also use information about an observed location distribution within the location range when generating a performance indicator. The observed location distribution may reflect the probability that the mobile computing device 102 is in a particular location within the location range. Any of a number of observed location distribution shapes may be used by the performance indicator logic 208. FIGS. 6-8 illustrate a number of observed location distribution shapes over a substantially circular location range 300 (e.g., as discussed above with reference to FIG. 3). The use of a circular location range is simply illustrative, and any location range shape may be used. Additionally, although FIGS. 6-8 illustrate a number of different probability distribution shapes, these are only examples, and any desired probability distribution shape may be used. Analytical or numerical representations of these observed location distributions may be stored in the storage device 236, and may be accessed by the performance indicator logic 208.

The top portion of FIG. 6 illustrates an observed location distribution shape 600 reflecting the probability distribution 602 of the presence of the mobile computing device 102 based on the location 604. The observed location distribution shape 600 is substantially Gaussian, but is truncated at the edges of the location range 300. In the observed location distribution shape 600, the mobile computing device 102 is most likely to be located close to the center of the location range 300, but there is a nonzero probability that it is located at the boundary 306 of the location range 300. Although the observed location distribution shape 600 of FIG. 6 is illustrated as two-dimensional, this is simply for ease of illustration, and a three-dimensional "heat map" representation of the observed location distribution shape 600 is shown in the bottom portion of FIG. 6. The top portion of FIG. 7 illustrates an observed location distribution shape 700 reflecting the probability distribution 702 of the presence of the mobile computing device 102 based on the location 704. The observed location distribution shape 700 is substantially Gaussian, but is reduced to zero at the edges of the location range 300. In the observed location distribution shape 700, the mobile computing device 102 is most likely to be located close to the center of the location range 300, and the probability reduces to zero at the boundary 306 of the location range 300. Although the observed location distribution shape 700 of FIG. 7 is illustrated as two-dimensional, this is simply for ease of illustration, and a three-dimensional "heat map" representation of the observed location distribution shape 700 is shown in the bottom portion of FIG. 7.

The top portion of FIG. 8 illustrates an observed location distribution shape 800 reflecting the probability distribution 802 of the presence of the mobile computing device 102 based on the location 804. The observed location distribution shape 800 is substantially uniform, reflecting in equal probability of the mobile computing device 102 being present at any location in the location range 300. In the observed location distribution shape 800, the mobile computing device 102 is most likely to be located close to the center of the location range 300, and the probability reduces to zero at the boundary 306 of the location range 300. Although the observed location distribution shape 800 of FIG. 8 is illustrated as two-dimensional, this is simply for ease of illustration, and a three-dimensional "heat map" representation of the observed location distribution shape 800 is shown in the bottom portion of FIG. 8.

In some embodiments, the performance indicator logic 208 may be configured to select the observed location distribution shape from a plurality of observed location distribution shapes (e.g., stored in the storage device 236) when generating performance indicators. In some embodiments, the observed location distribution shape selected by the performance indicator logic 208 may be a function of the type of data used to generate the location signal and/or the velocity signal. For example, a location signal generated from cellular or WiFi data may be better approximated as a uniform distribution over the location range, while a location signal generated from GPS data may be better approximated by a modified Gaussian distribution over the location range. The storage device 236 may include a table that associates different location data sources with different observed location distributions; the performance indicator logic 208 may retrieve the appropriate observed location distribution from the table based on the location data source (e.g., encoded in the location signal or otherwise provided by the location logic 204).

The performance indicators generated by the performance indicator logic 208 may take any of a number of forms. A number of examples are discussed below.

The control operations logic 202 may include selection logic 210, which may be coupled with the performance indicator logic 208, and may be configured to select a geofence crossing time from the plurality of candidate geofence crossing times based on the performance indicators generated by the performance indicator logic 208. The rule by which the selection logic 210 selects a geofence crossing time may depend on the form of the performance indicator generated by the performance indicator logic 208. In some embodiments, the selection logic 210 may select the geofence crossing time with the performance indicator having the largest value. In some embodiments, the selection logic 210 may select the geofence crossing time with the performance indicator having the smallest value. In some embodiments, the selection logic 210 may combine the performance indicators with other data to perform the selection. For example, the selection logic 210 may be configured to select a geofence crossing time with the highest value performance indicator that is within a predetermined amount of time from a present time.

The control operations logic 202 may include control logic 212, which may be coupled with the selection logic 210, and may be configured to transmit a control signal representative of the geofence crossing time (selected by the selection logic 210). The control signal may be transmitted within the geofence crossing control system 200, or to a device outside of the geofence crossing control system 200. A number of embodiments of control signals are discussed below. In some embodiments, the control logic 212 may include performance indicators associated with the geofence crossing time in the control signal, or may transmit these performance indicators in a separate signal.

As noted above, the performance indicator logic 208 may be configured to generate a performance indicator for each of a plurality of candidate geofence crossing times. The performance indicators may be based on the location signal, the velocity signal, and the boundary of the geofence. FIGS. 9-14 illustrate how a first example performance indicator, P_HIT, may be generated by the performance indicator logic 208. In particular, FIG. 9 illustrates a scenario in which the performance indicator logic 208 (not shown) receives a location signal indicating the location range 300 at a time T1, a velocity signal indicating the velocity 900 at the time T1, and data indicative of a geofence 904 with a boundary 902 (e.g., retrieved from the storage device 236). The performance indicator logic 208 may determine that, at the time T1, the location range 300 does not overlap with the geofence 904, and thus that the probability that the mobile computing device 102 is in the geofence 904 is zero. The performance indicator logic 208 may store a value of "0" (e.g., in the storage device 236) for the performance indicator P_HIT associated with the candidate geofence crossing time T1 (i.e., P_HIT(T1)=0).

FIG. 10 illustrates a scenario in which the performance indicator logic 208 extrapolates that, based on the location range 300 at the time T1 and the velocity 900 at the time T1 (FIG. 9), at a time T2 later than T1, the mobile computing device 102 will be in the location range 1002. The time T2 may be a predetermined amount of time after the time T1 (e.g., 2 seconds), and this amount of time is preprogrammed into the performance indicator logic 208 (e.g., stored in the storage device 236). This extrapolation (and the extrapolations discussed below) may depend on the assumption that the velocity of the mobile computing device 102 does not change in the interval between T1 and T2. This assumption may be valid over short intervals, and may nevertheless be useful in extrapolating the location of the mobile computing device 102. In some embodiments, the velocity signal generated by the velocity logic 206 may include information about a rate and/or direction of change of the velocity of the mobile computing device 102; in such embodiments, the performance indicator logic 208 may use this information to adjust the location range 1002 (and additional location ranges, as discussed below) in accordance with the expected change in the velocity 900.

In FIG. 10, the location range 1002 overlaps with the geofence 904, indicating that there is a nonzero probability that the mobile computing device 102 has crossed into the geofence 904. The performance indicator logic 208 (not shown) may determine the overlap area 1000, and may store the overlap area (e.g., in the storage device 236) for the performance indicator P_HIT associated with the candidate geofence crossing time T2 (i.e., P_HIT(T2)). In some embodiments, the overlap area 1000 may be a weighted overlap area 1000, which may be weighted by an observed location distribution on the location range 1002. For example, if the observed location distribution indicates that the probability is low that the mobile computing device 102 is near the boundary of the location range 1002, an overlap including the boundary of the location range 300 may be weighted less than an overlap including a more central portion of the location range 300. In some embodiments, this weighting may take the form of integrating the observed location distribution over the boundaries of the overlap area 1000 to generate the overlap area 1000, in accordance with:

$$P\_HIT = \int_{x \text{ in overlap area}} \text{location\_distribution}(x)dx. \quad (1)$$

where the variable x ranges over all locations in the overlap area 1000. Such a weighted overlap area may be indicative of the probability that the mobile computing device 102 is within the geofence 904, based on the observed location distribution. In embodiments in which the observed location distribution is uniform, no computational weighting operation may be necessary since all locations in the location range 300 have equal weight.

FIG. 11 illustrates a scenario in which the performance indicator logic 208 extrapolates that, based on the location range 300 at the time T1 and the velocity 900 at the time T1 (FIG. 9), at a time T3 later than T2, the mobile computing device 102 will be in the location range 1102. The time T3 may be a predetermined amount of time after the time T2, as discussed above with reference to FIG. 10. In FIG. 11, the location range 1102 overlaps with the geofence 904, indicating that there is a nonzero probability that the mobile computing device 102 has crossed into the geofence 904. The performance indicator logic 208 may determine the overlap area 1100 (which may be, e.g., a weighted overlap area, as discussed above with reference to FIG. 10), and may store the overlap area 1100 (e.g., in the storage device 236) for the performance indicator P_HIT associated with the candidate geofence crossing time T3 (i.e., P_HIT(T3)).

FIG. 12 illustrates a scenario in which the performance indicator logic 208 extrapolates that, based on the location range 300 at the time T1 and the velocity 900 at the time T1 (FIG. 9), at a time T4 later than T3, the mobile computing device 102 will be in the location range 1202. The time T4 may be a predetermined amount of time after the time T3, as discussed above with reference to FIG. 10. In FIG. 12, the location range 1202 overlaps with the geofence 904, indicating that there is a nonzero probability that the mobile computing device 102 has crossed into the geofence 904. The performance indicator logic 208 may determine the overlap area 1200 (which may be, e.g., a weighted overlap area, as discussed above with reference to FIG. 10), and may store the overlap area 1200 (e.g., in the storage device 236) for the performance indicator P_HIT associated with the candidate geofence crossing time T4 (i.e., P_HIT(T4)).

FIG. 13 illustrates a scenario in which the performance indicator logic 208 extrapolates that, based on the location range 300 at the time T1 and the velocity 900 at the time T1 (FIG. 9), at a time T5 later than before, the mobile computing device 102 will be in the location range 1302. The time T5 may be a predetermined amount of time after the time T4, as discussed above with reference to FIG. 10. In FIG. 13, the location range 1302 overlaps with the geofence 904, indicating that there is a nonzero probability that the mobile computing device 102 has crossed into the geofence 904. The performance indicator logic 208 may determine the overlap area 1300 (which may be, e.g., a weighted overlap area, as discussed above with reference to FIG. 10), and may store the overlap area 1300 (e.g., in the storage device 236)

for the performance indicator P_HIT associated with the candidate geofence crossing time T5 (i.e., P_HIT(T5)).

FIG. 14 is a graph depicting P_HIT 1402 as a function of time 1404. The curve 1406 represents the value of P_HIT at various candidate geofence crossing times, including the candidate geofence crossing times T1, T2, T3, T4, and T5 and their respective values of P_HIT. The use of five labeled candidate geofence crossing times T1, T2, T3, T4, and T5 is simply illustrative, and any number of candidate geofence crossing times may be used (e.g., any desired number of points along the curve 1406). A time of T0 is denoted in the graph of FIG. 14, indicating the first candidate time after which the value of P_HIT has become positive. A time of Tend is also denoted in the graph of FIG. 14, indicating the first candidate time after the value of P_HIT has become positive at which P_HIT reaches 100% (and thus the mobile computing device 102 has certainly entered the geofence) or reaches 0% (and thus is certainly not within the geofence), whichever occurs first. In scenarios in which the mobile computing device 102 is on a trajectory in which the mobile computing device 102 may or may not enter the geofence, P_HIT may not reach a value of 100%, and thus Tend may occur when P_HIT returns to 0%. Such a scenario is depicted in FIG. 14. By focusing on the times before P_HIT reaches 100% or 0% after being initially positive, only the "boundary stage" in which the mobile computing device 102 may or may not be in the fence may be considered. This may improve computational efficiency by focusing on the times at which the location of the mobile computing device 102 relative to the boundary is uncertain.

In some embodiments, the performance indicator logic 208 may generate the values of P_HIT as the performance indicators associated with different candidate geofence crossing times, and the selection logic 210 may select the geofence crossing time with the highest value of P_HIT. Such embodiments may have higher latency than other approaches described herein, as the geofence crossing may have occurred previous to the selected geofence crossing time (e.g., as discussed above with reference to the existing approach in which a geofence boundary crossing is reported when the boundary of the location range of the mobile computing device is first wholly contained in the geofenced area).

In some embodiments, the performance indicator logic 208 may generate the P_HIT curve 1406, and may generate additional values based on the P_HIT curve 1406 to generate one or more performance indicators. In particular, the performance indicator logic 208 may calculate various areas under the P_HIT curve 1406, and other properties of the P_HIT curve 1406, and use these properties to generate one or more performance indicators.

Figures 15, 16, 17, 18, 19:
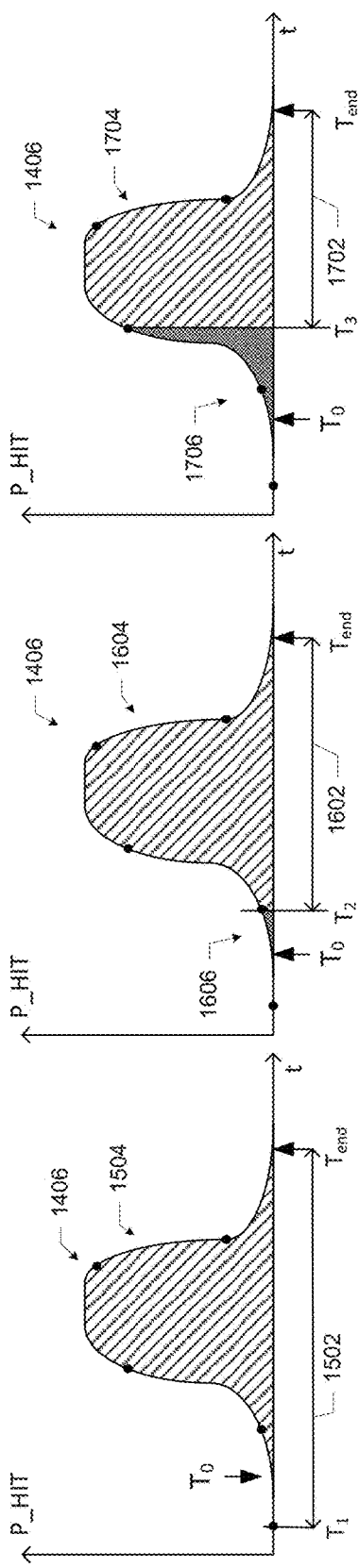
FIGS. 15-19 depict various properties of the first example performance indicator of FIG. 14, in accordance with various embodiments.

FIGS. 15-19 depict various properties of the P_HIT curve 1406. These properties may be calculated by the performance indicator logic 208 as part of the generation of a performance indicator. FIG. 15 illustrates the calculation of the time elapsed $\Delta T$ 1502 between the candidate geofence crossing time T1 and the time Tend. FIG. 15 also illustrates that the area A2 1504 under the P_HIT curve 1406 occurring at times later than the time T1 and up to the time Tend (indicated by the diagonal shading) comprises all of the area under the P_HIT curve 1406. No area under the P_HIT curve 1406 occurs previous to the time T1.

FIG. 16 illustrates the calculation of the time elapsed $\Delta T$ 1602 between the candidate geofence crossing time T2 and the time Tend. FIG. 16 also illustrates the area A2 1604 under the P_HIT curve 1406 occurring at times later than the time T2 and up to the time Tend (indicated by the diagonal shading) and the area A1 1606 under the P_HIT curve 1406 occurring at times between the time T0 and the time T2 (indicated by the solid shading).

FIG. 17 illustrates the calculation of the time elapsed $\Delta T$ 1702 between candidate geofence crossing time T3 and the time Tend. FIG. 17 also illustrates the area A2 1704 under the P_HIT curve 1406 occurring at times later than the time T3 and up to the time Tend (indicated by the diagonal shading) and the area A1 1706 under the P_HIT curve 1406 occurring at times between the time T0 and the time T3 (indicated by the solid shading).

FIG. 18 illustrates the calculation of the time elapsed $\Delta T$ 1802 between the candidate geofence crossing time T4 and the time Tend. FIG. 18 also illustrates the area A2 1804 under the P_HIT curve 1406 occurring at times later than the time T4 and up to the time Tend (indicated by the diagonal shading) and the area A1 1806 under the P_HIT curve 1406 occurring at times between the time T0 and the time T4 (indicated by the solid shading).

FIG. 19 illustrates the calculation of the time elapsed $\Delta T$ 1902 between the candidate geofence crossing time T5 and the time Tend. FIG. 19 also illustrates the area A2 1904 under the P_HIT curve 1406 occurring at times later than the time T5 and up to the time Tend (indicated by the diagonal shading) and the area A1 1906 under the P_HIT curve 1406 occurring at times between the time T0 and the time T5 (indicated by the solid shading).

The performance indicator logic 208 may calculate the elapsed times $\Delta T$ and the areas A1 and A2 discussed above with reference to FIGS. 15-19 for each of the plurality of candidate geofence crossing times, and may use these areas and elapsed times to generate one or more performance indicators.

In some embodiments, the performance indicator logic 208 may generate, for each candidate geofence crossing time, a precision indicator representative of a likelihood that the mobile computing device 102 crosses the boundary of the geofence after the candidate geofence crossing time. The precision indicator PI may be calculated in accordance with:

$$PI = A2/(\Delta T). \tag{2}$$

Figure 20:
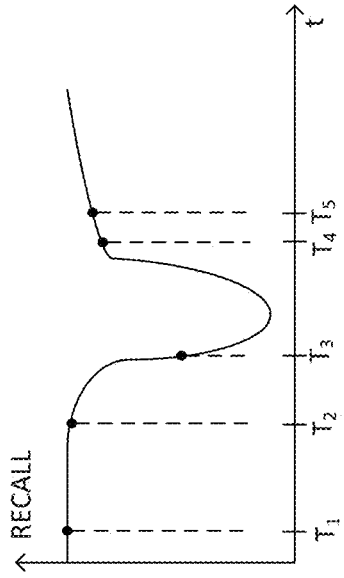
FIGS. 20-23 illustrate additional example performance indicators, in accordance with various embodiments.

The precision indicator of Eq. 2 is illustrated in the graph of FIG. 20.

In some embodiments, the performance indicator logic 208 may generate, for each candidate geofence crossing time, a recall indicator representative of a likelihood that the mobile computing device 102 crosses the boundary of the geofence after the candidate geofence crossing time, given that the mobile computing device 102 crosses the boundary of the geofence. The recall indicator RI may be calculated in accordance with:

$$RI = A2/(A1 + A2). \tag{3}$$

Figure 21:
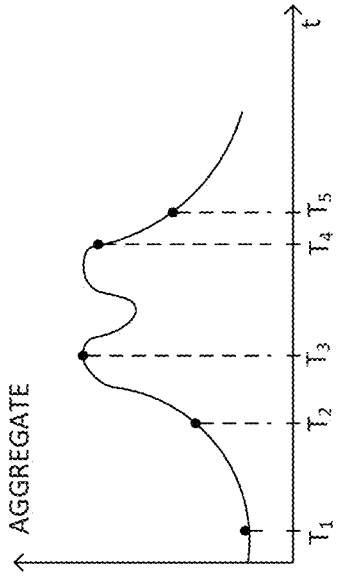

The recall indicator of Eq. 3 is illustrated in the graph of FIG. 21.

Figure 22:
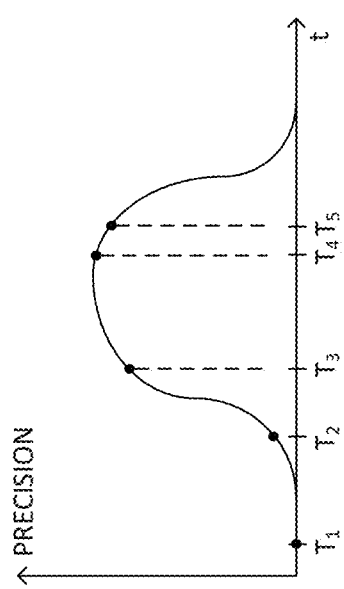

In some embodiments, the performance indicator logic 208 may generate, for each candidate geofence crossing time, a latency indicator representative of the expected delay between the crossing of the geofence boundary by the mobile computing device 102 and the candidate geofence crossing time. The latency indicator LI may be calculated in accordance with:

$$LI = \frac{\int_{T0}^{Tcandidate} (Tcandidate - t) P\_HIT(t) dt}{\int_{T0}^{Tcandidate} P\_HIT(t) dt} \tag{4}$$

where Tcandidate is the candidate geofence crossing time and t is the variable of integration. The latency indicator of Eq. 4 is illustrated in the graph of FIG. 22.

Figure 23:
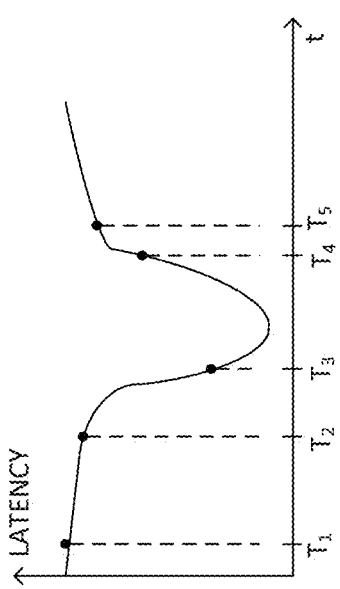

In some embodiments, the performance indicator logic 208 may generate, for each candidate geofence crossing time, a precision indicator (e.g., in accordance with Eq. 2) and a recall indicator (e.g., in accordance with Eq. 3), and may also generate, for each candidate geofence crossing time, an aggregate performance indicator based on a combination of the precision indicator and a recall indicator. This combination may take any of a number of forms. For example, in some embodiments, an aggregate performance indicator AGGREGATE may be generated by a weighted combination of the precision indicator and a recall indicator in accordance with:

$$\text{AGGREGATE}=(1+w)(RI*PI)/(w*RI+PI) \quad (5)$$

where w is a weight parameter that may be adjusted to control the balance between the precision indicator and a recall indicator in the aggregate performance indicator. The value for the parameter w may be predetermined (e.g., 0.5) and stored in the storage device 236, and may be selected in any desired manner. For example, higher values of w may be associated with a higher weight given to the precision indicator relative to the recall indicator or latency indicator. If a user or developer wishes to improve the probability that the mobile computing device 102 is within the geofence after a crossing is reported, a higher value for w may be suitable. If a user or developer wishes to improve the probability that any geofence crossing will be detected (and is willing to risk "false positive" reports), a lower value of w may be suitable. A value of 1 for w may reflect an equal emphasis on precision and recall. A value of 0.5 for w, for example, may emphasize recall and latency (e.g., to avoid missing a geofence crossing). The aggregate performance indicator of Eq. 5 is illustrated in the graph of FIG. 23. As shown in FIG. 23, the AGGREGATE curve may have two peaks, reflecting the "best" entrance and exit crossing times, respectively.

The aggregate performance indicator of Eq. 5 may be particularly advantageous over existing geofence crossing approaches. For example, the geofence crossing time associated with the largest value of the aggregate performance indicator may have an improved precision, recall, and latency relative to any of the existing approaches discussed above. This performance improvement may be observed under a range of different observed location distributions, geofence boundary shapes, and mobile computing device location range shapes (e.g., when a mobile computing device with a circular location range and modified Gaussian distribution approaches the middle of a circular geofence, when a mobile computing device with a circular location range and a uniform distribution approaches the middle of a square geofence, and when a mobile computing device with a circular location range and modified Gaussian distribution skims by a corner of a square geofence).

In some embodiments, the performance indicator logic 208 may dynamically adjust the value of the weight parameter w of Eq. 5 in response to feedback from computing devices that receive data representative of the candidate crossing time (e.g., in control signals, as discussed below). For example, if a parent is dissatisfied with the delay between when her child's mobile computing device actually crosses into a "School Zone" geofence and when the crossing is reported or predicted, the parent may signal this dissatisfaction via his or her own mobile computing device or personal computing device (e.g., by tapping a "too much delay" icon on a touchscreen), and the feedback signal may be transmitted to the geofence crossing control system 200 (e.g., via a similar communication pathway as the one used to transmit the control signal) and processed by the performance indicator 208. For example, "too much delay" may be mitigated by decreasing the weight w to put greater emphasis on the recall indicator in the aggregate performance indicator of Eq. 5.

The aggregate performance indicator of Eq. 5 is not the only aggregate performance indicator that may be used. Any desired combination of the precision, recall, and latency indicators, as well as any other desired performance indicators, may be used to form an aggregate performance indicator. Such aggregate performance indicators may include one or more weights or other tunable parameters to adjust geofence crossing performance to achieve desired results. In some embodiments, the latency indicator may be correlated with the recall indicator (with higher recall correlated with shorter latency), and so some aggregate performance indicators may include one or another, but not both. As discussed above, the techniques disclosed herein may be applied to exit crossings as well as to entrance crossings. In some embodiments, the performance indicators used for evaluating candidate geofence crossing times for an exit may differ from the performance indicators used for evaluating candidate geofence crossing times for an entrance. For example, the weight parameter w used for the aggregate performance indicator of Eq. 5 may be different when evaluating an exit crossing versus an entrance crossing. In particular, since latency may be less important in some applications for exit crossings, in some embodiments, it may be desirable to increase the value of the weight parameter w for exit crossings relative to entrance crossings (to decrease the importance of recall and its correlate, latency).

The performance indicator logic 208 may output the final performance indicator (e.g., the aggregate performance indicator discussed above with reference to FIG. 23) for each of the plurality of candidate geofence crossing times to the selection logic 210. The selection logic 210 may select a geofence crossing time from the plurality of candidate geofence crossing times based on the performance indicators. For example, for the aggregate performance indicator discussed above with reference to FIG. 23, the selection logic 210 may select the geofence crossing time associated with the performance indicator having the highest value.

FIG. 24 illustrates an example data structure 2400 that may be used to store data generated by the performance indicator logic 208 during the generation of performance indicators for each of a plurality of candidate geofence crossing times. The data structure 2400 may include a plurality of rows 2422, one for each of the plurality of candidate geofence crossing times 2402. The data structure 2400 may include a number of columns, each storing data that may be used by the performance indicator logic 208 to generate a performance indicator for the associated candidate geofence crossing time. For example, the data structure 2400 includes a column 2404 for P_HIT values (e.g., as discussed above with reference to FIG. 14), a column 2406 for area A1 values (e.g., as discussed above with reference to FIGS. 15-19), a column 2408 for area A2 values (e.g., as discussed above with reference to FIGS. 15-19), a column 2410 for an elapsed time ΔT (e.g., as discussed above with reference to FIGS. 15-19), a column 2412 for a precision indicator (e.g., as discussed above with reference to FIG. 20), a column 2414 for a recall indicator (e.g., as discussed above with reference to FIG. 21), a column 2416 for a latency indicator (e.g., as discussed above with reference to FIG. 22), and a column 2418 for an aggregate performance indicator (e.g., as discussed above with reference to FIG. 23).

The data structure 2400 may also store data generated by components other than the performance indicator logic 208. For example, the data structure 2400 may include a column 2420 that indicates, with a binary variable, whether the associated candidate geofence crossing time was selected by the selection logic 210.

As discussed above, the control logic 212 may be configured to transmit a control signal representative of the geofence crossing time selected by the selection logic 210. This control signal may be used to trigger any desired activity based on the geofence crossing time, or to generate any desired display indicative of the geofence crossing time.

For example, in some embodiments, transmitting a control signal representative of the geofence crossing time may include transmitting a signal for a visual indicator to a graphical user interface (GUI) of a computing device representative of the geofence crossing time. The computing device may be the mobile computing device 102 (e.g., "You are about to cross into the 'School Zone'"), the stationary personal computing device 104 (e.g., "Sally is about to cross into the 'School Zone'"), or the remote computing device 106 (e.g., "The total number of users in the 'School Zone' is now 7"). An illustrative GUI 2500 having visual indicators 2502 and 2504 representative of geofence crossing times for two different mobile computing devices MD1 and MD2 is illustrated in FIG. 25. The visual indicator 2502 indicates that the mobile computing device MD1 is projected to enter the geofence "School Zone" at a later time, and the visual indicator 2504 indicates that the mobile computing device MD2 previously entered the geofence "Home."

In some embodiments, transmitting a signal for a visual indicator to a GUI of a computing device representative of the geofence crossing time (e.g., as discussed above with reference to FIG. 25) may include transmitting a signal for a visual indicator to a graphical user interface of a computing device at the geofence crossing time. In response to receiving a signal transmitted at the geofence crossing time selected by the selection logic 210, the receiving computing device may display a responsive, real-time alert indicating the crossing. FIG. 26 depicts an illustrative GUI 2600 having a visual indicator 2602 that is displayed in response to receiving such a signal transmitted at the geofence crossing time. FIG. 27 depicts a visual indicator 2702 that may be displayed on a heads-up display 2700 of a wearable or other computing device. The visual indicator 2702 may include a textual message 2704 indicating the crossing, and may include a photograph 2706 or other representation of a user of the mobile computing device 102 associated with the crossing.

In some embodiments, transmitting a control signal representative of the geofence crossing time to the computing system or another computing system may include transmitting a control signal to allow or disallow a predetermined functionality of the mobile computing device 102. For example, when the mobile computing device 102 is predicted to have crossed into a "School Zone" (e.g., because the selected geofence crossing time has passed), web browsing, text, social media, and other predetermined functionalities may be disabled or limited. When the mobile computing device 102 is predicted to have exited the "School Zone," these functionalities may be re-enabled. Which functionalities are allowed and disallowed upon the crossing of various geofence boundaries may be configured and stored in the mobile computing device 102 itself, or on a stationary personal computing device 104 or a remote computing device 106 and communicated to the mobile computing device 102.

Figure 28:
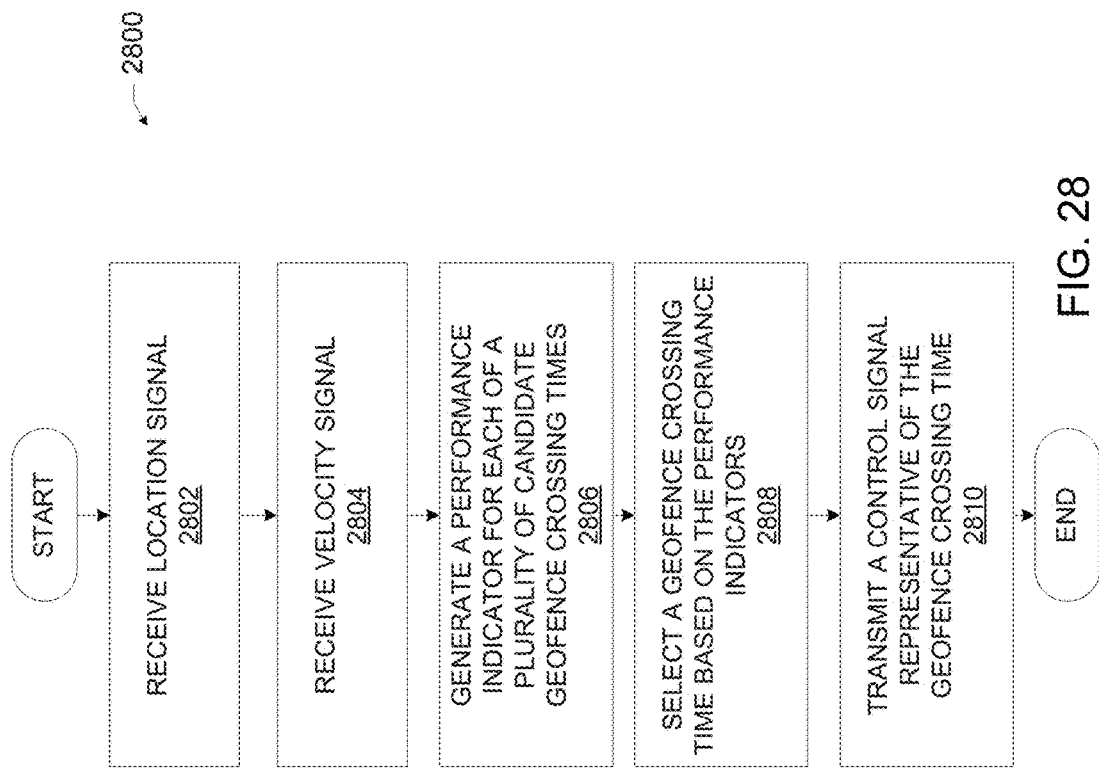
FIGS. 28 and 29 are flow diagrams of illustrative processes for geofence crossing-based control, in accordance with various embodiments.

FIG. 28 is a flow diagram of an illustrative process 2800 for control based on geofence crossings. The operations of the process 2800 (and the other processes described herein), although illustrated as performed in a particular sequence for the sake of illustration, may be performed in parallel as suitable or in any other order. For example, operations related to receiving a location signal and a velocity signal may be performed in parallel, partially in parallel, or in any suitable order, relative to operations related to processing the location and velocity signals.

Operations of the process 2800 (and the other processes described herein) may be described as performed by components of the system 200, as embodied in the computing system 100, for illustrative purposes, but the operations of the process 2800 (and the other processes described herein) may be performed by any suitably configured computing device or collection of computing devices. Any of the operations of the process 2800 (and the other processes described herein) may be performed in accordance with any of the embodiments of the systems 100 and 200 described herein.

At 2802, the geofence crossing control system 200 may receive a location signal indicative of a range of locations in which the mobile computing device 102 may be located. In some embodiments, the location signal may be indicative of a nominal location and an accuracy radius (e.g., as discussed above with reference to FIG. 3).

At 2804, the geofence crossing control system 200 may receive a velocity signal indicative of the speed at which the mobile computing device 102 is moving and a direction in which the mobile computing device 102 is moving.

At 2806, the geofence crossing control system 200 may generate, for each of a plurality of candidate geofence crossing times, a performance indicator based on the location signal, the velocity signal, and a boundary of the geofence. In some embodiments, generating a performance indicator may include generating a precision indicator (e.g., as discussed above with reference to FIG. 20), generating a recall indicator (e.g., as discussed above with reference to FIG. 21), generating a latency indicator (e.g., as discussed above with reference to FIG. 22), and/or generating an aggregate performance indicator (e.g., as discussed above with reference to FIG. 23). In some embodiments, generating a performance indicator may include selecting an observed location distribution shape from a plurality of observed location distribution shapes, and using the observed location distribution shape in the generation of the performance indicator.

At 2808, the geofence crossing control system 200 may select a geofence crossing time from the plurality of candidate geofence crossing times based on the performance indicators.

At 2810, the geofence crossing control system 200 may transmit a control signal representative of the geofence crossing time to a computing device. The computing device receiving the control signal may be a same computing device as the computing device instantiating the performance indicator logic 208, the selection logic 210, and the control logic 212, or may be a different computing device. In some embodiments, transmitting a control signal may include transmitting a signal for a visual indicator to a GUI of the geofence crossing time (e.g., at the geofence crossing time). Transmitting a control signal may include transmitting a wireless signal from the computing device instantiating the control logic 212 to another computing device.

In some embodiments, transmitting a control signal representative of the geofence crossing time (e.g., as discussed above with reference to the control logic 212 and the process of FIG. 28) may include causing a location measurement device (such as the GPS device 226, the image capture device 224, or the WiFi device 228) to delay a next location measurement until the geofence crossing time.

Figure 29:
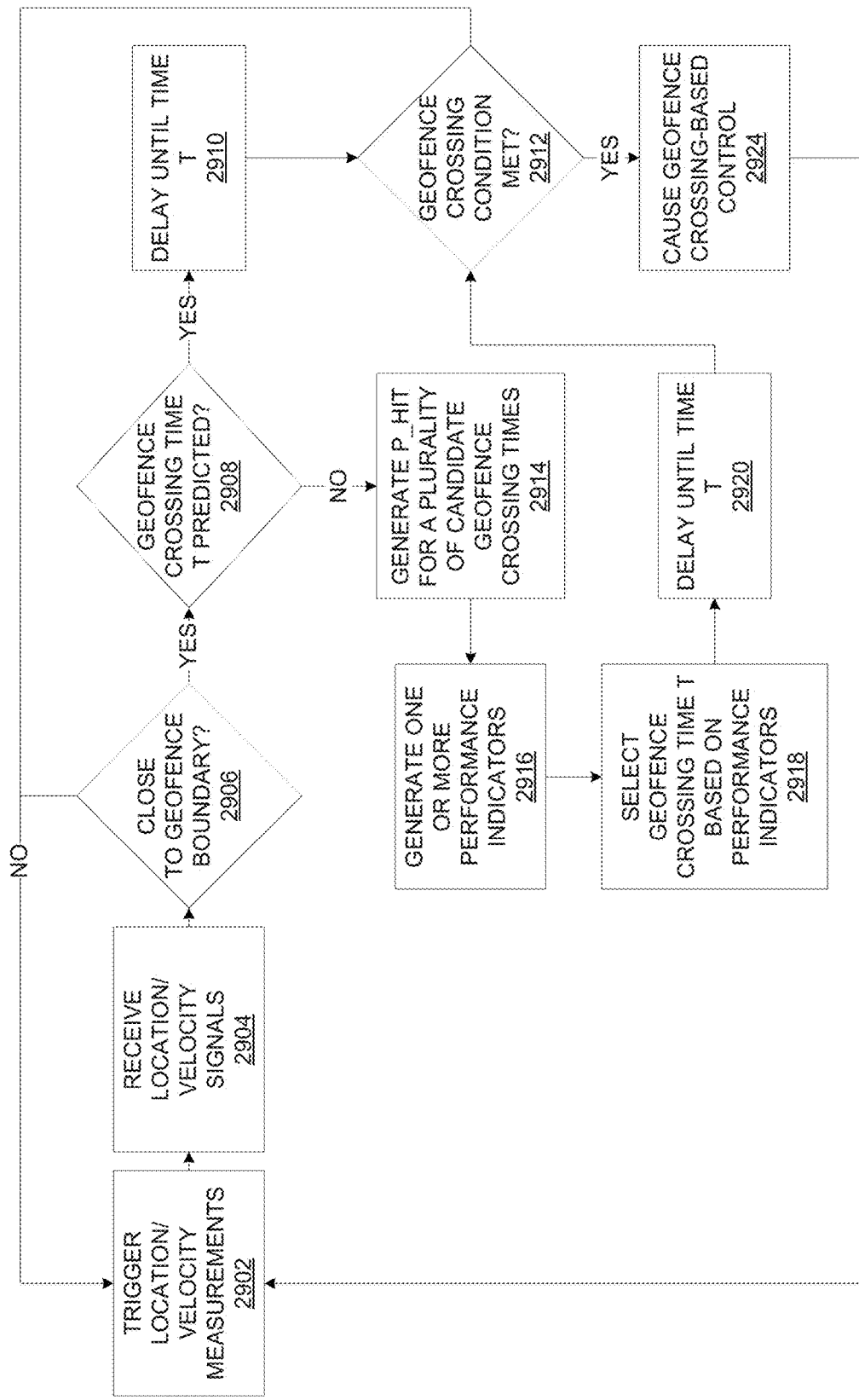

FIG. 29 is a flow diagram of an illustrative process 2900 for control based on geofence crossings.

At 2902, a location measurement and a velocity measurement of the mobile computing device 102 may be triggered by the geofence crossing control system 200. The location measurement and the velocity measurement may be performed by the location logic 204 and the velocity logic 206, respectively, based on signals received from one or more of the I/O devices 230 (e.g., the GPS device 226, the WiFi device 228, and/or the image capture device 224). Location and velocity signals may be provided based on the location and velocity measurements, respectively.

At 2904, the location signal and the velocity signals may be received in the geofence crossing control system 200 (e.g., by the performance indicator logic 208).

At 2906, the location and velocity signals may be processed by the geofence crossing control system 200 to determine whether the mobile computing device 102 is "close" to a boundary of a geofence. In some embodiments, the performance indicator logic 208 may perform this processing, and may generate a nominal or average location based on the location signal, compare the nominal or average location to known geofence boundaries (e.g., stored in the storage device 236), and determine whether the nominal or average location is within a predetermined distance of a geofence boundary (e.g., 500 feet). The predetermined distance may be a function of the speed and direction of the mobile computing device 102; for example, when the mobile computing device 102 is moving more quickly, the predetermined distance may be less.

If the mobile computing device 102 is determined not to be "close" to a geofence boundary at 2906, the process may return to 2902 and a location and velocity measurement may be triggered after a predetermined amount of time has passed since the previous 2902.

If the mobile computing device 102 is determined, at 2906, to be "close" to a geofence boundary, the geofence crossing control system 200 may determine whether a geofence crossing time T was previously predicted (e.g., by the performance indicator logic 208 and the selection logic 210). If yes, the geofence crossing control system 200 may proceed to 2910 and delay any additional location or velocity measurements until the predicted geofence crossing time T. At 2912, the geofence crossing control system 200 may determine whether a geofence crossing condition has been met. In some embodiments, the geofence crossing condition may simply be the arrival of the predicted geofence crossing time T. In some embodiments, the geofence crossing condition may be the detection of an environmental condition that indicates that the mobile computing device 102 is in the geofence (e.g., detection of a particular wireless network identifier, detection of a particular landmark in an image captured by the image capture device 224, or detection of a proximate computing device via Near Field Communication (NFC) or Bluetooth). In some embodiments, determining whether the geofence crossing condition has been met may include triggering another location measurement, and determining whether the location range returned by that location measurement indicates that the mobile computing device 102 is likely in the geofence. For example, if the another location measurement indicates that the center of the location range is in the geofence, the geofence crossing condition may be met. Any component of the geofence crossing control system 200 (e.g., the performance indicator logic 208, the selection logic 210, or the control logic 212) may be configured to perform the operations discussed above with reference to 2912.

If the geofence crossing control system 200 determines at 2912 that the geofence crossing condition is met, the process may proceed to 2924 at which the geofence crossing control system 200 may perform geofence crossing-based control. Geofence crossing-based control may include transmitting any of the control signals described herein (e.g., the triggering of any one or more device operations or causing the display of geofence-related data). If the geofence crossing control system 200 determines at 2912 that the geofence crossing condition has not been met, the process may return to 2902 and a location and velocity measurement may be triggered after a predetermined amount of time has passed since the previous 2902.

If the geofence crossing control system 200 determines at 2908 that the geofence crossing time T has not been previously predicted, the geofence crossing control system 200 may initiate geofence crossing time prediction operations. These geofence crossing time prediction operations may take the form of any of the candidate geofence crossing time evaluation operations described herein with reference to various performance indicators. FIG. 29 illustrates a particular sequence of geofence crossing time prediction operations. At 2914, the geofence crossing control system 200 (e.g., the performance indicator logic 208) may generate P_HIT values for a plurality of candidate geofence crossing times. At 2916, the geofence crossing control system 200 (e.g., the performance indicator logic 208) may generate one or more performance indicators for each of the candidate geofence crossing times based on the P_HIT values. For example, the performance indicator logic 208 may generate an aggregate performance indicator as discussed above with reference to Eq. 5. At 2918, the geofence crossing control system 200 (e.g., the selection logic 210) may select a predicted geofence crossing time T based on the performance indicator(s) of 2916. At 2920, the geofence crossing control system 200 may delay any additional location or velocity measurements until the predicted geofence crossing time T, then proceed to 2912.

The following paragraphs provide illustrative examples of some of the embodiments disclosed herein. Example 1 is a computing system for control based on geofence crossings, including: performance indicator logic to receive a location signal indicative of a range of locations in which a mobile computing device is located, receive a velocity signal indicative of a speed at which the mobile computing device is moving and a direction in which the mobile computing device is moving, and for each of a plurality of candidate geofence crossing times, generate a performance indicator based on the location signal, the velocity signal, and a boundary of the geofence; selection logic, coupled with the performance indicator logic, to select a geofence crossing time from the plurality of candidate geofence crossing times based on the performance indicators; and control logic, coupled with the selection logic, to transmit a control signal representative of the geofence crossing time to the computing system or another computing system.

Example 2 may include the subject matter of Example 1, and may further include location logic to generate the location signal.

Example 3 may include the subject matter of any of Examples 1-2, and may further specify that the location signal is generated by the mobile computing device, and the performance indicator logic is included in a computing device remote from the mobile computing device.

Example 4 may include the subject matter of any of Examples 1-3, and may further specify that the performance indicator logic is included in the mobile computing device.

Example 5 may include the subject matter of any of Examples 1-4, and may further specify that the performance indicator logic is further configured to retrieve geofence boundary data from a storage device that is remote from the performance indicator logic.

Example 6 may include the subject matter of any of Examples 1-5, and may further specify that: generate a performance indicator based on the location signal, the velocity signal, and a boundary of the geofence includes generate a weighted combination of a precision indicator and a recall indicator; the precision indicator representative of a likelihood that the mobile computing device crosses the boundary of the geofence after the associated candidate geofence crossing time; and the recall indicator representative of a likelihood that the mobile computing device crosses the boundary of the geofence after the associated candidate geofence crossing time, given that the mobile computing device crosses the boundary of the geofence.

Example 7 may include the subject matter of any of Examples 1-6, and may further specify that transmit a control signal representative of the geofence crossing time to the computing system or another computing system includes transmit a control signal to the mobile computing device representative of the geofence crossing time for display on a graphical user interface of the mobile computing device.

Example 8 may include the subject matter of any of Examples 1-7, and may further specify that transmit a control signal representative of the geofence crossing time to the computing system or another computing system includes transmit a control signal to a computing device other than the mobile computing device, the control signal representative of the geofence crossing time for display on a graphical user interface of the computing device.

Example 9 may include the subject matter of any of Examples 1-8, and may further specify that transmit a control signal representative of the geofence crossing time to the computing system or another computing system includes transmit a control signal to allow or disallow a predetermined functionality of the mobile computing device.

Example 10 is a method for control based on geofence crossings, including: receiving, by a computing device, a location signal indicative of a range of locations in which a mobile computing device is located; receiving, by the computing device, a velocity signal indicative of a speed at which the mobile computing device is moving and a direction in which the mobile computing device is moving; for each of a plurality of candidate geofence crossing times, generating, by the computing device, a performance indicator based on the location signal, the velocity signal, and a boundary of the geofence; selecting, by the computing device, a geofence crossing time from the plurality of candidate geofence crossing times based on the performance indicators; and transmitting, by the computing device, a control signal representative of the geofence crossing time to the computing device or another computing device.

Example 11 may include the subject matter of Example 10, and may further specify that the location signal is indicative of a nominal location and an accuracy radius.

Example 12 may include the subject matter of any of Examples 10-11, and may further specify that generating a performance indicator based on the location signal, the velocity signal, and a boundary of the geofence includes generating a precision indicator representative of a likelihood that the mobile computing device crosses the boundary of the geofence after the associated candidate geofence crossing time.

Example 13 may include the subject matter of any of Examples 10-12, and may further specify that generating a performance indicator based on the location signal, the velocity signal, and a boundary of the geofence includes generating a recall indicator representative of a likelihood that the mobile computing device crosses the boundary of the geofence after the associated candidate geofence crossing time, given that the mobile computing device crosses the boundary of the geofence.

Example 14 may include the subject matter of any of Examples 10-13, and may further specify that: generating a performance indicator based on the location signal, the velocity signal, and a boundary of the geofence includes generating a weighted combination of a precision indicator and a recall indicator; the precision indicator representative of a likelihood that the mobile computing device crosses the boundary of the geofence after the associated candidate geofence crossing time; and the recall indicator representative of a likelihood that the mobile computing device crosses the boundary of the geofence after the associated candidate geofence crossing time, given that the mobile computing device crosses the boundary of the geofence.

Example 15 may include the subject matter of any of Examples 10-14, and may further specify that generating a performance indicator based on the location signal, the velocity signal, and a boundary of the geofence includes selecting an observed location distribution shape, from a plurality of observed location distribution shapes, wherein the performance indicator is further based on the observed location distribution shape.

Example 16 may include the subject matter of any of Examples 10-15, and may further specify that transmitting a control signal representative of the geofence crossing time includes transmitting a signal for a visual indicator to a graphical user interface of a computing device representative of the geofence crossing time.

Example 17 may include the subject matter of Example 16, and may further specify that transmitting a signal for a visual indicator to a graphical user interface of a computing device representative of the geofence crossing time includes transmitting a signal for a visual indicator to a graphical user interface of a computing device at the geofence crossing time.

Example 18 may include the subject matter of any of Examples 10-17, and may further specify that transmitting a control signal representative of the geofence crossing time includes transmitting a wireless signal, from the computing device to another computing device, representative of the geofence crossing time.

Example 19 may include the subject matter of any of Examples 10-18, and may further specify that transmitting a control signal representative of the geofence crossing time includes causing a location measurement device to delay a next location measurement until the geofence crossing time.

Example 20 is a system for control based on geofence crossings, including: means for receiving a location signal indicative of a range of locations in which a mobile computing device is located; means for receiving a velocity signal indicative of a speed at which the mobile computing device is moving and a direction in which the mobile computing device is moving; means for, for each of a plurality of candidate geofence crossing times, generating a performance indicator based on the location signal, the velocity signal, and a boundary of the geofence; means for selecting a geofence crossing time from the plurality of candidate geofence crossing times based on the performance indicators; and means for transmitting a control signal representative of the geofence crossing time to the computing device or another computing device.

Example 21 may include the subject matter of Example 20, wherein: the means for generating a performance indicator based on the location signal, the velocity signal, and a boundary of the geofence includes means for generating a weighted combination of a precision indicator and a recall indicator; the precision indicator representative of a likelihood that the mobile computing device crosses the boundary of the geofence after the associated candidate geofence crossing time; and the recall indicator representative of a likelihood that the mobile computing device crosses the boundary of the geofence after the associated candidate geofence crossing time, given that the mobile computing device crosses the boundary of the geofence.

Example 22 may include the subject matter of any of Examples 20-21, and may further specify that the means for transmitting a control signal representative of the geofence crossing time includes means for transmitting a signal for a visual indicator to a graphical user interface of a computing device representative of the geofence crossing time.

Example 23 may include the subject matter of Example 22, and may further specify that the means for transmitting a signal for a visual indicator to a graphical user interface of a computing device representative of the geofence crossing time includes means for transmitting a signal for a visual indicator to a graphical user interface of a computing device at the geofence crossing time.

Example 24 is one or more computer readable media having instructions thereon that, in response to execution by one or more processing devices of a computing device, cause the computing device to perform the method of any of Examples 10-19.

Example 25 is a system including means for performing the method of any of Examples 10-19.

Example 26 is one or more computer readable media having instructions thereon that, in response to execution by one or more processing devices of a computing device, cause the computing device to: receive a location signal indicative of a range of locations in which a mobile computing device is located; receive a velocity signal indicative of a speed at which the mobile computing device is moving and a direction in which the mobile computing device is moving;

for each of a plurality of candidate geofence crossing times, generate a performance indicator based on the location signal, the velocity signal, and a boundary of the geofence; select a geofence crossing time from the plurality of candidate geofence crossing times based on the performance indicators; and transmit a control signal representative of the geofence crossing time to the computing device or another computing device.

Example 27 may include the subject matter of Example 26, and may further specify that the location signal is indicative of a nominal location and an accuracy radius.

Example 28 may include the subject matter of any of Examples 26-27, and may further specify that generate a performance indicator based on the location signal, the velocity signal, and a boundary of the geofence includes generate a precision indicator representative of a likelihood that the mobile computing device crosses the boundary of the geofence after the associated candidate geofence crossing time.

Example 29 may include the subject matter of any of Examples 26-28, and may further specify that generate a performance indicator based on the location signal, the velocity signal, and a boundary of the geofence includes generate a recall indicator representative of a likelihood that the mobile computing device crosses the boundary of the geofence after the associated candidate geofence crossing time, given that the mobile computing device crosses the boundary of the geofence.

Example 30 may include the subject matter of any of Examples 26-29, and may further specify that: generate a performance indicator based on the location signal, the velocity signal, and a boundary of the geofence includes generate a weighted combination of a precision indicator and a recall indicator; the precision indicator is representative of a likelihood that the mobile computing device crosses the boundary of the geofence after the associated candidate geofence crossing time; and the recall indicator is representative of a likelihood that the mobile computing device crosses the boundary of the geofence after the associated candidate geofence crossing time, given that the mobile computing device crosses the boundary of the geofence.

Example 31 may include the subject matter of any of Examples 26-30, and may further specify that generate a performance indicator based on the location signal, the velocity signal, and a boundary of the geofence includes select an observed location distribution shape, from a plurality of observed location distribution shapes, wherein the performance indicator is further based on the observed location distribution shape.

Example 32 may include the subject matter of any of Examples 26-31, and may further specify that transmit a control signal representative of the geofence crossing time includes transmit a signal for a visual indicator to a graphical user interface of a computing device representative of the geofence crossing time.

Example 33 may include the subject matter of Example 32, and may further specify that transmit a signal for a visual indicator to a graphical user interface of a computing device representative of the geofence crossing time includes transmit a signal for a visual indicator to a graphical user interface of a computing device at the geofence crossing time.

Example 34 may include the subject matter of any of Examples 26-33, and may further specify that transmit a control signal representative of the geofence crossing time includes transmit a wireless signal, from the computing device to another computing device, representative of the geofence crossing time.

Example 35 may include the subject matter of any of Examples 26-34, and may further specify that transmit a control signal representative of the geofence crossing time includes cause a location measurement device to delay a next location measurement until the geofence crossing time.

What is claimed is:

1. A mobile computer system for control based on geofence crossings, comprising:
   one or more types of communication circuitry, wherein
      each type of communication circuitry of the one or more types of communication circuitry is configured to communicate using corresponding communication signaling; and one or more processors coupled with a memory device and coupled with one or more types of communication circuitry, wherein the one or more processors are to execute performance indicator program code to:
  receive, from first communication circuitry of the one or more types of communication circuitry, a location signal indicative of a range of potential locations in which the mobile computer system is currently located,
  receive a velocity signal indicative of a speed at which the mobile computer is moving and a direction in which the mobile computer system is moving,
  determine an observed location distribution that corresponds with first communication signaling of the first communication circuitry wherein the observed location distribution is among a plurality of observed location distribution shapes and wherein individual observed location distribution shapes of the plurality of observed location distribution shapes are associated with individual ones of the one or more types of communication circuitry, and
  generate, for each of a plurality of candidate geofence crossing times, a performance indicator based at least in part on the velocity signal and the range of potential locations weighted by the observed location distribution shape; and the one or more processors are to execute selection logic to select a geofence crossing time from the plurality of candidate geofence crossing times based on the performance indicators; and the one or more processors are to execute control program code to transmit a control signal to the mobile computer system or another computer device, wherein the control signal is for performance of an action by the mobile computer system or the other computer device based on the selected geofence crossing time.

2. The mobile computer system of claim 1, wherein the observed location distribution shape indicates a probability that the mobile computer system is located at each location of the range of potential locations, and wherein:
  the one or more processors are to execute location program code to generate the location signal wherein the range of potential locations is bounded by a location range boundary, wherein the location range boundary is an enclosed geometric shape, and wherein:
  when the location range boundary is a circular location range boundary, the location signal is to indicate a nominal location and an accuracy radius of the circular location range boundary,
  when the location range boundary is an irregular shaped location range boundary, the location signal is to be encoded with a number of points along the location range boundary, and
  when the location range boundary is a polygonal location range boundary, the location signal is to be encoded with information indicative of boundary corners of the location range boundary and boundary segments that connect the boundary corners.

3. The mobile computer system of claim 1, wherein the location signal is generated by the first communication circuitry, and the performance indicator for each candidate geofence crossing time is to indicate a probability that the mobile computer system will cross a boundary of the geofence at each candidate geofence crossing time.

4. The mobile computer system of claim 1, wherein the first communication circuitry is to receive the location signal from a network element that is external to the mobile computer system.

5. The mobile computer system of claim 1, wherein the one or more processors are to execute the performance indicator program code to:
  retrieve geofence boundary data from a storage device that is remote from the performance indicator program code.

6. The mobile computer system of claim 1, wherein, to generate the performance indicator, the one or more processors are to execute the performance indicator program code to:
  generate a weighted combination of a precision indicator and a recall indicator;
  wherein the precision indicator is representative of a likelihood that the mobile computer system crosses the boundary of the geofence after the associated candidate geofence crossing time; and
  wherein the recall indicator is representative of a likelihood that the mobile computer system crosses the boundary of the geofence after the associated candidate geofence crossing time, given that the mobile computer system crosses the boundary of the geofence.

7. The mobile computer system of claim 1, wherein the one or more processors are to execute the control program code to control receipt of the control signal from a remote computing device, and the action comprises display of a visual indicator of the geofence crossing time on a graphical user interface of the mobile computer system.

8. The mobile computer system of claim 1, wherein the one or more processors are to execute the control program code to transmit the control signal to a computer device other than the mobile computer system, and the action comprises display of a visual indicator of the geofence crossing time on a graphical user interface of the computer device.

9. The mobile computer system of claim 1, wherein the one or more processors are to execute the control program code to send the control signal to one or more internal components of the mobile computer system to activate or deactivate a predetermined functionality of the mobile computer system, or the one or more processors are to execute the control program code to control transmission of the control signal to a computer device other than the mobile computer system for activation or deactivation of the predetermined functionality of the computer device other than the mobile computer system.

10. One or more non-transitory computer readable media (NTCRM) having instructions thereon which, in response to execution by one or more processing devices of a computer device, cause the computer device to:
  receive a location signal indicative of a location range boundary, wherein the location range boundary comprises a range of potential locations in which a mobile computer device is currently located, wherein the location signal is generated by a first communication circuitry of one or more types of communication circuitry and wherein each type of the one or more types of communication circuitry is configured to communicate using corresponding communication signaling;
  receive a velocity signal indicative of a speed at which the mobile computer device is moving and a direction in which the mobile computer device is moving;
  determine an observed location distribution shape of the location range boundary, wherein the observed location distribution shape indicates a probability that the mobile computer device is located at each location of the range of potential locations, wherein the observed location distribution shape is among a plurality of observed location distribution shapes, and wherein at least one of the plurality of observed location distribution shapes is associated with different communication signaling than other ones of the plurality of observed location distribution shapes;

generate, for each of a plurality of candidate geofence crossing times, a performance indicator based on a probability that the mobile computer device is within a boundary of a geofence, wherein the probability that the mobile computer device is within the boundary is based at least in part on the velocity signal and the boundary of the geofence, and the probability that the mobile computer device is within the boundary is weighted by the observed location distribution shape;

select a geofence crossing time from the plurality of candidate geofence crossing times based on the performance indicators; and control transmission of a control signal based on the selected geofence crossing time to the computer device, the mobile computer device, or another computer device, wherein the control signal is to cause the computer device, the mobile computer device, or the other computer device to perform an action before, at, or after the selected geofence crossing time.

11. The one or more NTCRM of claim 10, wherein the range of potential locations is bounded by a location range boundary, wherein the location range boundary is an enclosed geometric shape, and wherein:

when the location range boundary is a circular location range boundary, the location signal is indicative of a nominal location and an accuracy radius;

when the location range boundary is an irregular shaped location range boundary, the location signal is to be encoded with a number of points along the location range boundary; and when the location range boundary is a polygonal location range boundary, the location signal is to be encoded with information indicative of boundary corners of the location range boundary and boundary segments that connect the boundary corners.

12. The one or more NTCRM of claim 10, wherein, to generate the performance indicator based on the location signal, the velocity signal, and a boundary of the geofence, the computer device, in response to execution by the one or more processing devices, is to:

generate a precision indicator representative of a likelihood that the mobile computer device crosses the boundary of the geofence after the associated candidate geofence crossing time.

13. The one or more NTCRM of claim 10, wherein, to generate the performance indicator based on the location signal, the velocity signal, and the boundary of the geofence, the computer device, in response to execution by the one or more processing devices, is to:

generate a recall indicator representative of a likelihood that the mobile computer device crosses the boundary of the geofence after the associated candidate geofence crossing time, given that the mobile computer device crosses the boundary of the geofence.

14. The one or more NTCRM of claim 10, wherein, to generate the performance indicator based on the location signal, the velocity signal, and the boundary of the geofence, the computer device, in response to execution by the one or more processing devices, is to:

generate a weighted combination of a precision indicator and a recall indicator;

wherein the precision indicator is representative of a likelihood that the mobile computer device crosses the boundary of the geofence after the associated candidate geofence crossing time; and wherein the recall indicator is representative of a likelihood that the mobile computer device crosses the boundary of the geofence after the associated candidate geofence crossing time, given that the mobile computer device crosses the boundary of the geofence.

15. The one or more NTCRM of claim 10, wherein, to generate a performance indicator based on the location signal, the velocity signal, and the boundary of the geofence, the computer device, in response to execution by the one or more processing devices, is to:

select a location distribution shape, from a plurality of location distribution shapes, wherein the performance indicator is further based on the location distribution shape.

16. The one or more NTCRM of claim 10, wherein, to control transmission of the control signal representative of the geofence crossing time, the computer device, in response to execution by the one or more processing devices, is to:

control transmission of a signal encoded with information for display of a visual indicator in a graphical user interface of the computer device, wherein the visual indicator is representative of the geofence crossing time.

17. The one or more NTCRM of claim 16, wherein, to control transmission of the signal for the visual indicator to the graphical user interface of a computer device representative of the geofence crossing time, the computer device, in response to execution by the one or more processing devices, is to:

control transmission of the signal encoded with the information for the visual indicator to the graphical user interface of the computer device at the geofence crossing time.

18. The one or more NTCRM of claim 16, wherein, to control transmission of the control signal, the computer device, in response to execution by the one or more processing devices, is to:

control transmission of a wireless signal, from the computer device to the mobile computer device, such that the visual indicator is displayed at or prior to the geofence crossing time.

19. The one or more NTCRM of claim 10, wherein, to control transmission of the control signal representative of the geofence crossing time, the computer device, in response to execution by the one or more processing devices, is to:

cause a location measurement device to delay a next location measurement until the geofence crossing time.

20. One or more non-transitory computer readable media (NTCRM) including instructions, wherein execution of the instructions by one or more processors of a computer device is to cause the computer device to:

control receipt of individual location signals from corresponding components of a mobile device, wherein the individual location signals indicate a location range boundary indicative of a range of potential locations in which the mobile device is currently located;

control receipt of individual velocity signals from corresponding components of the mobile device, wherein the individual velocity signals are indicative of a travel speed of the mobile device and a travel direction of the mobile device;

determine an observed location distribution shape for the individual location signals based on the corresponding components from which the individual location signals are obtained, wherein the observed location distribution shape represents a probability that the mobile device is at an observed location within the range of potential locations, and wherein at least one of the corresponding components is associated with a different observed location distribution shape than other ones of the corresponding components;

determine a plurality of candidate geofence crossing times based on the observed location distribution shape for the individual location signals, the travel speed, the travel direction, and a geofence boundary, determine, for each candidate geofence crossing time of the plurality of candidate geofence crossing times, a probability that the mobile device is within the geofence boundary, wherein the probability that the mobile device is within the geofence boundary is based on an amount of overlap of the location range boundary and the geofence boundary, wherein the location range boundary is weighted by the observed location distribution shape and the amount of overlap is based at least in part on the travel speed and the travel direction;

generate a control signal, wherein the control signal is to cause the mobile device to perform an action; and control transmission of the control signal to the mobile device to cause the mobile device to perform the action at a predicted geofence crossing time, wherein the predicted geofence crossing time is a candidate geofence crossing time having a highest probability among the plurality of candidate geofence crossing times.

21. The one or more NTCRM of claim 20, wherein the location range boundary is an enclosed geometric shape, and wherein:

when the location range boundary is a circular location range boundary, the location signal is indicative of a nominal location and an accuracy radius;

when the location range boundary is an irregular shaped location range boundary, the location signal is to be encoded with a number of points along the location range boundary; and when the location range boundary is a polygonal location range boundary, the location signal is to be encoded with information indicative of boundary corners of the location range boundary and boundary segments that connect the boundary corners.

22. The one or more NTCRM of claim 20, wherein, to determine the probability for each candidate geofence crossing time, execution of the instructions is to cause the computer device to:

determine, for each candidate geofence crossing time, a precision indicator (PI) and a recall indicator (RI), wherein the PI is to indicate a probability that the mobile device has crossed into the geofence boundary when a geofence crossing event has been triggered, and wherein the RI is to indicate a probability that the mobile device has crossed the geofence boundary after a corresponding candidate geofence crossing time; and determine, for each candidate geofence crossing time, an aggregate indicator (AI) according to:

$$AI = \frac{(1+w)(RI*PI)}{(w*RI+PI)},$$

wherein w is a weight factor.

23. The one or more NTCRM of claim 22, wherein execution of the instructions is to cause the computer device to: control receipt of feedback from the mobile device or from another computer device; and adjust a value of the weight factor w based on the feedback.

24. The one or more NTCRM of claim 20, wherein execution of the instructions is to cause the computer device to:

control the mobile device to transition to an idle mode at a time corresponding to each candidate geofence crossing time having a probability that is below a threshold; and control the mobile device to transition to an active mode at a time corresponding to each candidate geofence crossing time having a probability that is above the threshold.

25. The one or more NTCRM of claim 20, wherein the control signal is to cause the mobile device to generate and display a visual indicator to indicate the predicted geofence crossing time.

26. The one or more NTCRM of claim 20, wherein the control signal is to enable or disable a desired functionality of the mobile device.

27. The one or more NTCRM of claim 20, wherein the computer device is implemented by the mobile device, and the components of the mobile device comprise one or more of cellular communications circuitry, WiFi communications circuitry, Global Positioning System (GPS) circuitry, and image capture circuitry.

\* \* \* \* \*